United States Patent
Watanabe

(10) Patent No.: US 9,638,109 B2
(45) Date of Patent: May 2, 2017

(54) VALVE TIMING CONTROL SYSTEM FOR INTERNAL COMBUSTION ENGINE AND LOCK RELEASE MECHANISM OF VALVE TIMING CONTROL APPARATUS FOR INTERNAL COMBUSTION ENGINE

(71) Applicant: HITACHI AUTOMOTIVE SYSTEMS, LTD., Hitachinaka-shi, Ibaraki (JP)

(72) Inventor: Kotaro Watanabe, Atsugi (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 14/220,645

(22) Filed: Mar. 20, 2014

(65) Prior Publication Data

US 2014/0283643 A1 Sep. 25, 2014

(30) Foreign Application Priority Data

Mar. 21, 2013 (JP) .................................. 2013-058881

(51) Int. Cl.
| | |
|---|---|
| *F01L 1/34* | (2006.01) |
| *F02D 13/02* | (2006.01) |
| *F01L 1/344* | (2006.01) |

(52) U.S. Cl.
CPC ............ *F02D 13/02* (2013.01); *F01L 1/3442* (2013.01); *F02D 13/0215* (2013.01);
(Continued)

(58) Field of Classification Search
CPC .... F02D 13/02; F02D 13/0215; F01L 1/3442; F01L 2001/34423; F01L 2001/34453
(Continued)

(56) References Cited

U.S. PATENT DOCUMENTS

| | | | |
|---|---|---|---|
| 8,467,926 B2 * | 6/2013 | Perkins ................. | B60W 10/08 701/22 |
| 8,960,142 B2 * | 2/2015 | Toma ..................... | F01L 1/344 123/90.15 |

(Continued)

FOREIGN PATENT DOCUMENTS

| | | |
|---|---|---|
| JP | H10-054215 A | 2/1998 |
| JP | 10-227236 A | 8/1998 |

(Continued)

OTHER PUBLICATIONS

U.S. Appl. No. 14/220,623, filed Mar. 20, 2014, Hitachi Automotive Systems, Ltd.
U. S. Notice of Allowance dated Nov. 16, 2015 issued in U.S. Appl. No. 14/220,623.

*Primary Examiner* — Ching Chang
(74) *Attorney, Agent, or Firm* — Foley & Lardner LLP

(57) ABSTRACT

A valve timing control system includes: a check valve which is provided between an oil pump driven by the engine, and the lock release passage; an electromagnetic valve which is disposed between the check valve and the lock release passage; an accumulator disposed between the check valve and the electromagnetic valve; and a passage which is disposed between the check valve and the electromagnetic valve, in which the flow of the oil is stored, and which is arranged to release the restriction of the lock mechanism by a pressure of the accumulator by energizing the valve driving solenoid of the electromagnetic valve.

18 Claims, 13 Drawing Sheets

(52) U.S. Cl.
CPC ........... *F01L 2001/34423* (2013.01); *F01L 2001/34453* (2013.01); *Y02T 10/18* (2013.01); *Y10T 74/2102* (2015.01)

(58) Field of Classification Search
USPC .......................... 123/90.12, 90.15, 90.17
See application file for complete search history.

(56) References Cited

U.S. PATENT DOCUMENTS

| | | | |
|---|---|---|---|
| 9,004,029 B2 * | 4/2015 | Watanabe | F01L 1/34 |
| | | | 123/90.15 |
| 9,121,312 B2 | 9/2015 | Kawamura | |
| 9,291,076 B2 * | 3/2016 | Watanabe | F01L 1/3442 |
| 9,309,789 B2 | 4/2016 | Hayashi | |
| 2002/0139332 A1 | 10/2002 | Takenaka | |
| 2012/0103289 A1 | 5/2012 | Kato et al. | |

FOREIGN PATENT DOCUMENTS

| | | |
|---|---|---|
| JP | 11-013429 A | 1/1999 |
| JP | 2001-041012 A | 2/2001 |
| JP | 2003-247434 A | 9/2003 |
| JP | 2010-255584 A | 11/2010 |
| JP | 2012-047061 A | 3/2012 |
| JP | 2012-097594 A | 5/2012 |
| JP | 2012-149598 A | 8/2012 |
| JP | 2014-077433 A | 5/2014 |

* cited by examiner

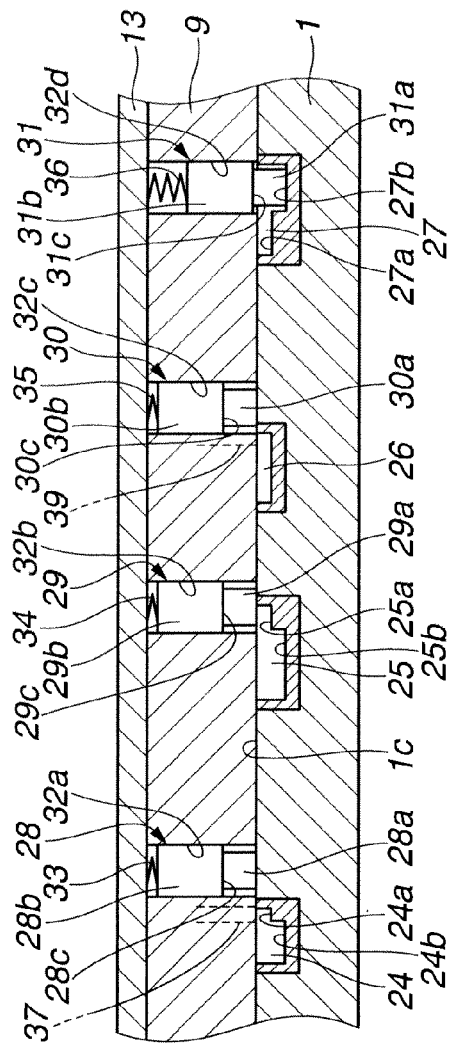
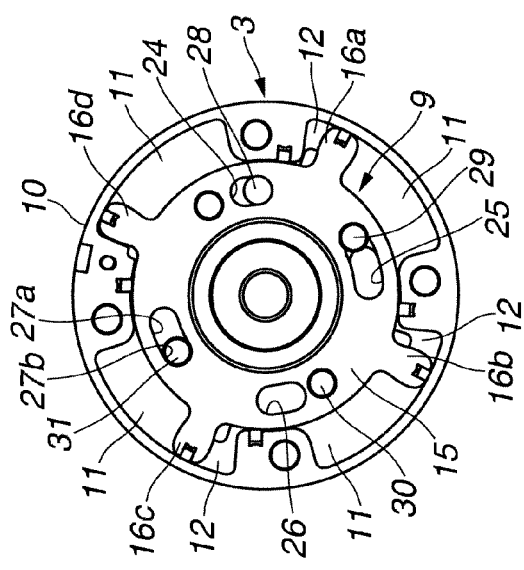

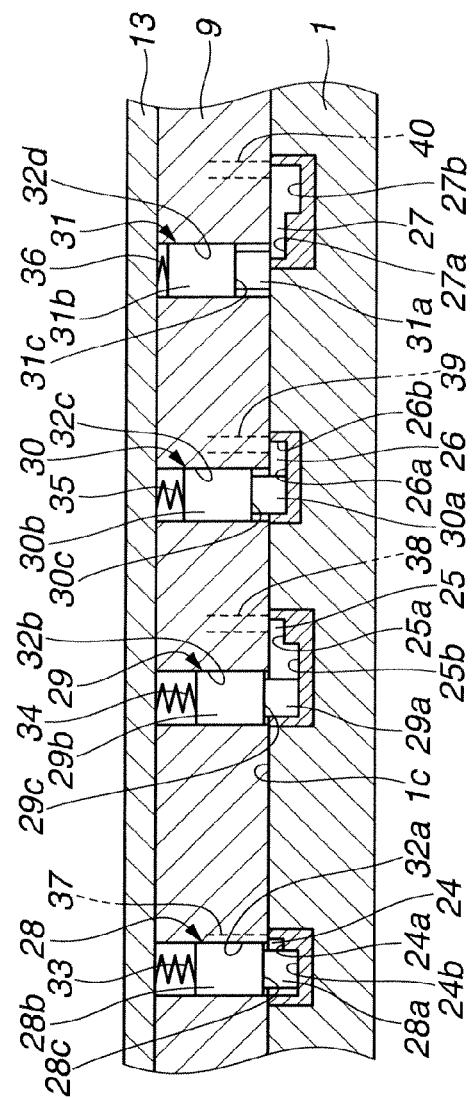
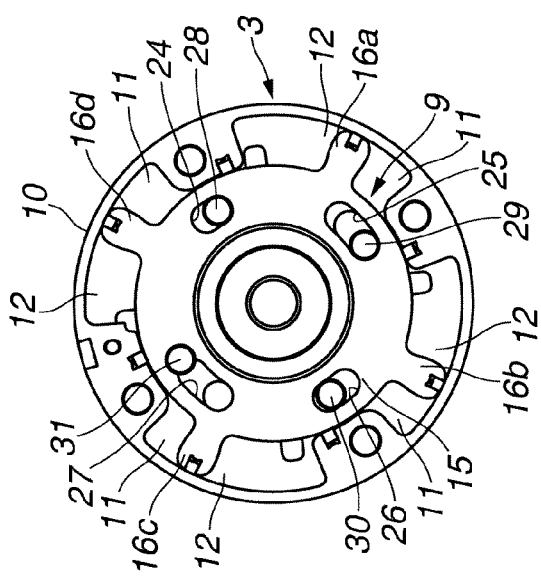
FIG.7A
FIG.7B

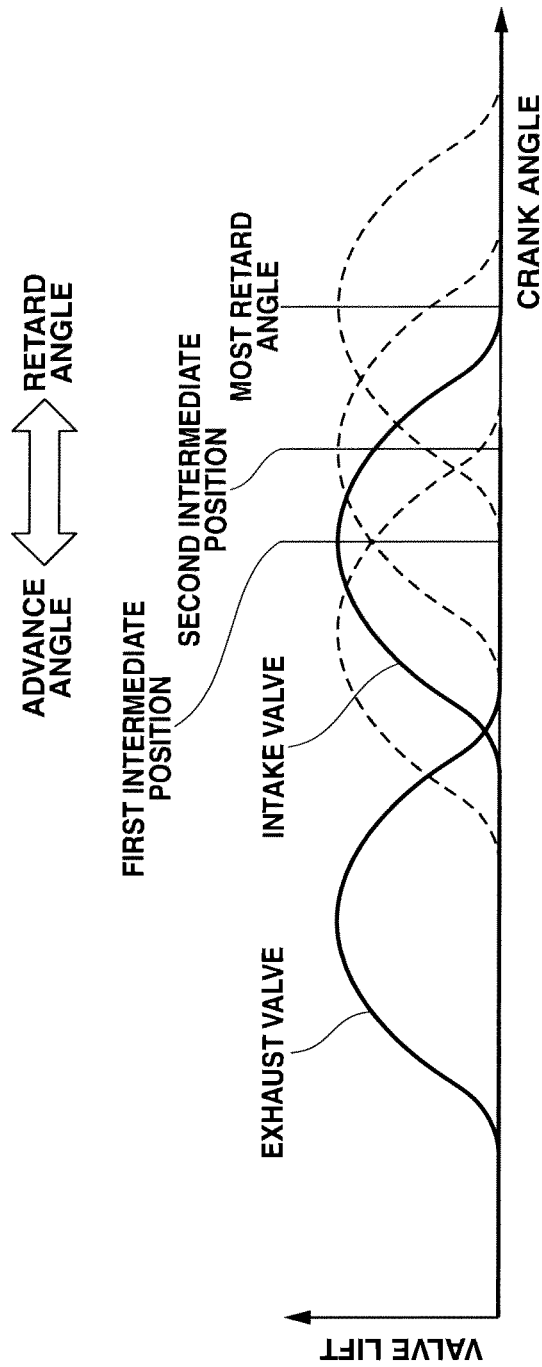

VALVE TIMING CONTROL SYSTEM FOR INTERNAL COMBUSTION ENGINE AND LOCK RELEASE MECHANISM OF VALVE TIMING CONTROL APPARATUS FOR INTERNAL COMBUSTION ENGINE

BACKGROUND OF THE INVENTION

This invention relates to a valve timing control system for an internal combustion engine which is arranged to vary opening and closing timings of an intake valve and an exhaust valve in accordance with a driving state of the engine, and a lock release mechanism of the valve timing control apparatus for the internal combustion engine.

A Japanese Patent Application Publication No. 10-227236 discloses a valve timing control apparatus arranged to vary opening and closing timings of an intake valve to a most retard angle position or a most advance angle position by a lock mechanism arranged to be actuated through a hydraulic pressure and so on, in accordance with a circumference of a start of an internal combustion engine.

SUMMARY OF THE INVENTION

However, in the above-described control system, at the stop of the engine, when a lock pin of the lock mechanism is engageably inserted in a lock hole, and locked at the most advance angle position or at the most retard angle position, it is difficult to generate a hydraulic pressure for releasing the lock of the lock pin at a restart of the engine. In particular, it is difficult to release the lock of the lock pin due to a high viscosity of the oil at the extreme low temperature start of the engine. Accordingly, it is not possible to vary the lock position in accordance with the circumstance of the start.

It is, therefore, an object of the present invention to provide a valve timing control system for an internal combustion engine which is devised to solve the above mentioned problems, and to release a lock at any start of the engine regardless of a circumstance of the start of the engine.

According to one aspect of the present invention, a valve timing control system for an internal combustion engine comprises: a driving rotational member to which a rotational force is transmitted from a crank shaft; a driven rotational member which is fixed to a cam shaft, and which is arranged to be relatively rotated with respect to the driving rotational member in an advance angle direction or in a retard angle direction in accordance with a request; a lock mechanism arranged to allow the relative rotation between the driving rotational member and the driven rotational member when a hydraulic pressure supplied to a lock release passage is equal to or greater than a predetermined pressure, and to restrict the relative rotation between the driving rotational member and the driven rotational member when the hydraulic pressure supplied to the lock release passage is smaller than the predetermined pressure; a check valve which is provided between an oil pump driven by the engine, and the lock release passage, which includes a valve seat, and a valve element arranged to be seated on and unseated from the valve seat, and which is arranged to unseat the valve element from the valve seat when a discharge pressure from the oil pump is greater than the hydraulic pressure of the lock release passage to allow a flow of the oil from the oil pump toward the lock release passage, and arranged to seat the valve element on the valve seat when the hydraulic pressure of the lock release passage is greater than the discharge pressure of the oil pump to restrict the flow of the oil from the lock release passage to the oil pump; an electromagnetic valve which is disposed between the check valve and the lock release passage, which includes a valve seat, a valve element, and a valve element driving solenoid, and which is arranged to seat the valve element on the valve seat in a deenergized state of the valve element driving solenoid to restrict the flow of the oil from the lock release passage toward the check valve, and arranged to unseat the valve element from the valve seat in an energized state of the valve driving solenoid so as to allow the flow of the oil from the check valve toward the lock release passage; an accumulator disposed between the check valve and the electromagnetic valve; and a passage which is disposed between the check valve and the electromagnetic valve, in which the flow of the oil is stored, and which is arranged to release the restriction of the lock mechanism by a pressure of the accumulator by energizing the valve driving solenoid of the electromagnetic valve.

According to another aspect of the invention, a valve timing control system for an internal combustion engine comprises: a driving rotational member to which a rotational force is transmitted from a crank shaft; a driven rotational member which is fixed to a cam shaft, and which is arranged to be rotated relative to the driving rotational member in an advance angle direction or in a retard angle direction in accordance with a request; a lock mechanism arranged to allow the relative rotation between the driving rotational member and the driven rotational member when a hydraulic pressure supplied to a lock release passage is equal to or greater than a predetermined hydraulic pressure, and to restrict the relative rotation between the driving rotational member and the driven rotational member when the hydraulic pressure supplied to the lock release passage is smaller than the predetermined hydraulic pressure; and an electric oil pump arranged to be driven in accordance with a request, and to supply an oil to the lock release passage.

According to still another aspect of the invention, a variable valve timing control apparatus for an internal combustion engine comprises: a driving rotational member to which a rotational force is transmitted from a crank shaft; a driven rotational member which is fixed to a cam shaft, and which is arranged to be rotated relative to the driving rotational member in an advanced angle direction or in a retard angle direction in accordance with a request; a lock mechanism arranged to allow a relative rotation of the driven rotational member with respect to the driving rotational member when a hydraulic pressure supplied to a lock release passage is equal to or greater than a predetermined hydraulic pressure, and to restrict the relative rotation between the driving rotational member and the driven rotational member when the hydraulic pressure supplied to the lock release passage is smaller than the predetermined hydraulic pressure; a check valve which is provided between the lock release passage and an oil pump driven by the internal combustion engine, and which is arranged to allow only a flow of an oil from the oil pump toward the lock release passage; an electromagnetic valve which is provided between the check valve and the lock release passage, which includes a valve seat, a valve element, and a valve element driving solenoid, and which is arranged to switch, by the valve element driving solenoid, a restriction state in which the valve element is seated on the valve seat to restrict a flow of the oil from the lock release passage toward the check valve, and a flow state in which the valve element is separated from the valve seat to allow the flow of the oil from the check valve toward the lock release passage; an accumulator provided between the check valve and the electromagnetic valve; and a space portion which is provided between the check valve and the electromagnetic valve, in which a leakage of the oil between an inner side and an outer side of the space portion is suppressed, and which is arranged to release the restriction by the lock mechanism by an energization of the valve driving solenoid of the electromagnetic valve.

BRIEF DESCRIPTION OF THE DRAWINGS

FIG. 5A is a partially sectional view showing a state in which a hydraulic pressure is supplied from an oil pump to the accumulator. FIG. 5B is a partially sectional view showing a state in which the supply of the hydraulic pressure to the accumulator is finished. FIG. 5C is a partially sectional view showing a state in which the hydraulic pressure is supplied from the accumulator in a direction toward a second electromagnetic switching valve.

FIG. 6A is a developed sectional view showing operations of lock pins when a vane rotor is rotated to a position near the most retard angle position. FIG. 6B is a front view showing rotational positions of the vane rotor and the lock pin which is locked.

FIG. 7A is a developed sectional view showing operations of the lock pins when the vane rotor is rotated to a first intermediate rotational position. FIG. 7B is a front view showing rotational positions of the vane rotor and the lock pin which is locked.

FIG. 9 is a characteristic view showing valve lift characteristics of an exhaust valve and an intake valve when the intake valve is positioned at the most regard angle phase position and the first and second intermediate rotational positions shown in FIGS. 6-8.

DETAILED DESCRIPTION OF THE INVENTION

Figure 1:
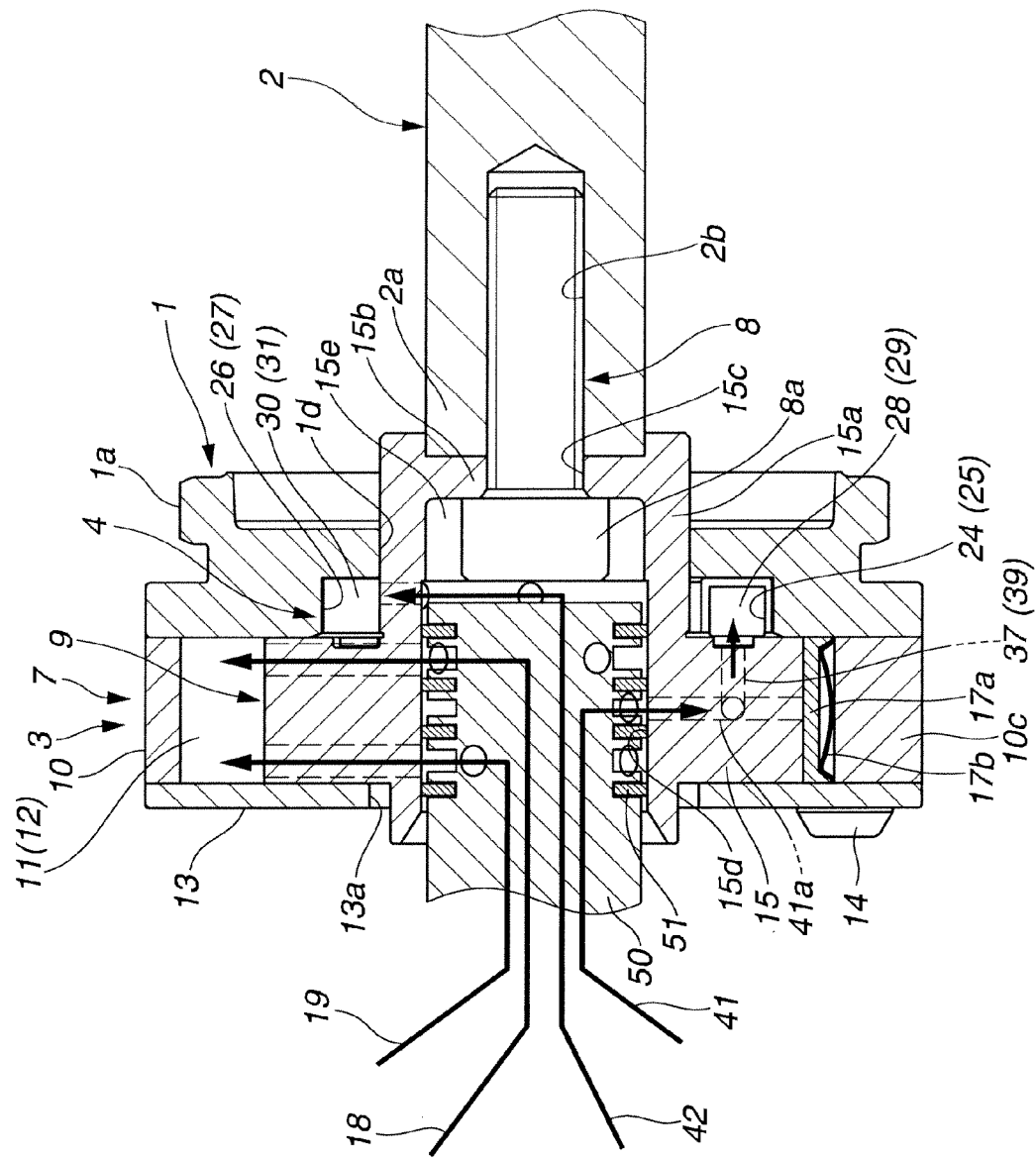
FIG. 1 is a sectional view showing a valve timing control system according to a first embodiment of the present invention.

Hereinafter, valve timing control apparatuses for an internal combustion engine according to the present invention are illustrated with reference to the drawings in which the present invention is applied to an intake valve of the internal combustion engine of a vehicle. Besides, the vehicle to which the present invention is applied includes an idling stop (start-stop) mechanism. Moreover, the internal combustion engine has a high compression ratio specification (for example, 12.6).

As shown in FIGS. 1-4, the valve timing control apparatus according to the first embodiment of the present invention includes a sprocket 1 which is a driving rotational member which is drivingly rotated through a timing chain by a crank shaft of the engine; a cam shaft 2 which is on the intake valve side, which is disposed along forward and rearward directions of the engine, and which is arranged to be rotated relative to sprocket 1; and a phase varying mechanism 3 which is disposed between sprocket 1 and cam shaft 2, and which is arranged to vary a relative rotational phase of sprocket 1 and cam shaft 2; a lock mechanism 4 which is arranged to lock phase varying mechanism 3 at a most retard angle phase position, and at an intermediate phase position between a most advance angle phase position and the most retard angle phase position; and a hydraulic circuit 5 which is arranged to independently supply the hydraulic pressure to phase varying mechanism 3 and lock mechanism 4, and to independently discharge the hydraulic pressure from phase varying mechanism 3 and lock mechanism 4, so as to actuate phase varying mechanism 3 and lock mechanism 4.

Sprocket 1 is constituted as a rear cover closing an rear end opening of a housing 7 described later. Sprocket 1 has a substantially circular plate shape having a large thickness. Sprocket 1 includes a gear portion is which is formed on an outer circumference of sprocket 1, and around which the timing chain is wound; and a support hole 1d which is formed at a central portion of sprocket 1, and which is rotatably supported on an outer circumference of a vane rotor 9 (described later) fixed to cam shaft 2. Moreover, sprocket 1 includes four internal screw holes 1b which are formed in the outer circumference portion of sprocket 1 at a regular interval in the circumference direction.

Cam shaft 2 is rotatably supported by a cylinder head (not shown) through cam bearings. Cam shaft 2 includes an outer circumference surface on which two oval drive cams (not shown) are integrally fixed at axial positions with respect to one cylinder; and an internal screw hole 2b which is formed at an inside of one end portion 2a in the axial direction. Each of the drive cams is arranged to open the intake valve which is an engine valve.

As shown in FIG. 1 to FIG. 4, phase varying mechanism 3 includes a housing 7 which is provided on the one end portion 2a's side of cam shaft 2; vane rotor 9 which is a driven rotational member that is fixed through a cam bolt 8 screwed in internal screw hole 2b of cam shaft 2 which is formed on the one end portion of cam shaft 2, and that is rotatably received within housing 7; four retard angle hydraulic chambers 11 which are retard angle operation chambers that are formed in the operation chamber within housing 7, and that are separated by vane rotor 9 and four shoes 10a-10d (described later) which are formed on an inner circumference surface of housing 7 to inwardly protrude toward the center; and four advance angle hydraulic chambers 12 which are advance angle operation chambers that are formed in the operation chamber within housing 7, and that are separated by vane rotor 9 and four shoes 10a-10d.

Housing 7 includes a housing main body 10 which has a cylindrical hollow shape; a front plate 13 which is formed by press-forming, and which closes a front end opening of housing main body 10; and sprocket 1 which is the rear cover that closes the rear end opening of housing main body 10.

Housing main body 10 is integrally formed from sintered metal. Housing main body 10 includes four shoes 10a-10d which are integrally formed on the inner circumference surface of housing main body 10, and which protrude from the inner circumference surface of housing main body 10; and bolt insertion holes 10e which are formed on the outer circumference side of shoes 10a-10d, and which penetrate through housing main body 10 in the axial direction.

Front plate 13 is made from a metal, and formed into a thin circular disc. Front plate 13 includes a through hole 13a which penetrates through front plate 13; and four bolt insertion holes 13b which are formed in the outer circumference portion of front plate 13 at a regular interval in the circumferential direction.

Sprocket 1, housing main body 10, and front plate 13 are tightened and fixed together by four bolts 14 screwed through bolt insertion holes 13b and 10e into internal screw holes 1b.

Figure 2:
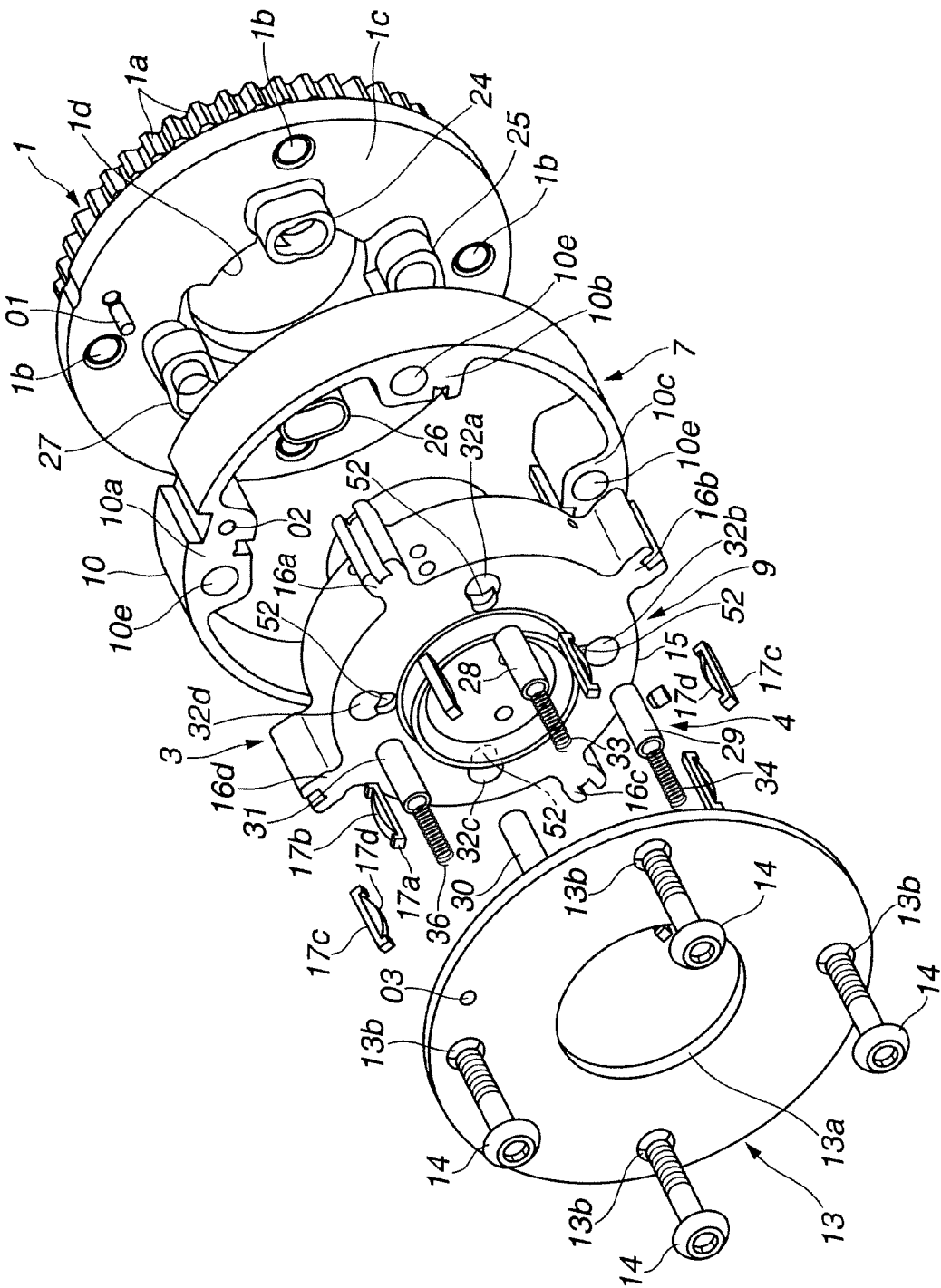
FIG. 2 is an exploded perspective view showing a main part of the valve timing control system of FIG. 1.

Besides, in FIG. 2, a numeral 01 is a positioning pin which is mounted to an outer circumference portion of an inner side surface of sprocket 1. This positioning pin 01 is inserted into a positioning hole 02 formed inside first shoe 10a of housing main body 10, and a positioning hole 03 which is formed in front plate 13, and which penetrates through front plate 13. With this, this positioning pin 01 positions housing main body 10 and front plate 13 with respect to sprocket 1 at the assembly operation.

Vane rotor 9 is integrally formed from the metal material. Vane rotor 9 includes a rotor 15 fixed to the one end portion of cam shaft 2 by cam bolt 8; and four vanes 16a-16d which are formed on the outer circumference surface of rotor 15 at the regular interval of 90 degrees in the circumferential direction, and which protrude from the outer circumference surface of rotor 15 in the radial direction.

As shown in FIG. 1, rotor 15 is formed into a relatively thick disc shape. Rotor 15 includes a fixing portion 15a which is formed at a central portion of rotor 15, and which is formed into a cylindrical shape having a bottom; and a bolt insertion hole 15c which is formed in a bottom wall 15b of fixing portion 15a, and through which cam bolt 8 is inserted. Bottom wall 15b of rotor 15 includes an inside bottom surface which is a seat surface for a head portion 8a of cam bolt 8. Moreover, fixing portion 15a includes a holding hole 15d which is formed inside fixing portion 15a, through which the entire of cam bolt 8 is inserted, and into which a passage constituting section 50 (described later) is inserted and fixed.

This rotor 15 includes arc outer circumference surfaces which are positioned between adjacent two of the vanes 16a-16d that are adjacent to each other in the circumferential direction, and which have the same radius of curvature. On these arc outer circumference surfaces of rotor 15, tip end edges of shoes 10a-10d are disposed to confront each other. Each of these tip end edges of rotor 15 includes a seal groove. Seal members 17a are held in the seal grooves of these tip end edges of rotor 15. Inner surfaces of seal members 17a are slidably abutted on these arc circumference surfaces of rotor 15. Each of seal members 17a has a substantially U-shape. Each of seal members 17a is urged toward the outer circumference surfaces of the arc portions of rotor 15 by a plate spring 17b provided in the hole portion of the seal groove.

Vanes 16a-16d have the substantially same protruding length. Vanes 16a-16d have the same circumferential width which is relatively thick. Each of vanes 16a-16d includes a seal groove which is formed on the tip end outer circumference portion of the each of vanes 16a-16d, which has a rectangular section, and which extends in the axial direction. Seal members 17c are provided in the seal grooves of vanes 16a-16d. Each of seal members 17c has a substantially U-shape. Seal members 17c are slidably abutted on the inner circumference surface of housing main body 10. These seal members 17c are urged toward the inner circumference surface of housing main body 10 by plate springs 17c which are disposed within the inside of the seal grooves.

Shoes 10a-10d, vanes 16a-16d, and seal members 17a and 17c constantly seal portions between retard angle hydraulic chambers 11 and advance angle hydraulic chambers 12.

Figure 3:
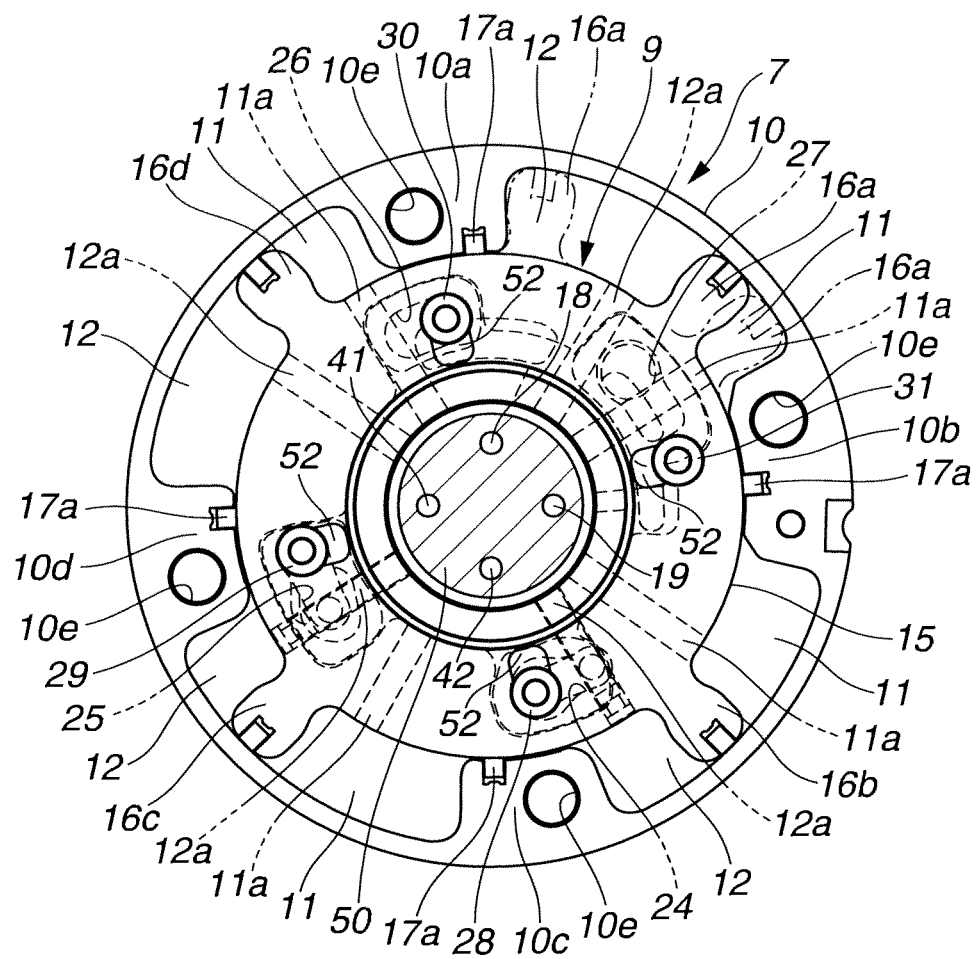
FIG. 3 is a front view showing the valve timing control system of FIG. 1 from which a front plate is detached.

Moreover, as shown in FIG. 3, when vane rotor 9 is relatively rotated in the retard angle direction, one end side surface of first vane 16a is abutted on a confronting side surface of first shoe 10a which confronts the one end side surface of first vane 16a, so that vane rotor 9 is restricted at the most retard angle side of the rotational position. When vane rotor 9 is relatively rotated in the advance angle direction, the other side surface of first vane 16a is abutted on a confronting side surface of the other second shoe 10b which confronts the other side surface of first vane 16a, so that vane rotor 9 is restricted at the rotational position on the most advance angle side.

In this case, the other vanes 16b-16d are in the separating state in which both side surfaces of the other vanes 16b-16d are not abutted on confronting surfaces of shoes 10a-10d. Accordingly, the accuracy of the abutments between vane rotor 9 and shoes 10 is improved. The supply speed of the hydraulic pressure to hydraulic pressure chambers 11 and 12 is increased. Consequently, the response of the rotation of vane rotor 9 in the forward and reverse directions is increased.

Besides, at the normal relative rotation control with housing 3, vane rotor 9 is relatively controlled between the most retard angle phase and the most advance angle phase in which first vane 16a (described later) is abutted on first shoe 10a or second shoe 10b, that is, within a region slightly near the intermediate portion.

Retard angle hydraulic chambers 11 and advance angle hydraulic chambers 12 described above are separated between the both side surfaces of vanes 16a-16d which extend in the rotational axis direction, and the both side surfaces of shoes 10a-10d. These retard angle hydraulic chambers 11 and advance angle hydraulic chambers 12 have the substantially identical volume.

Moreover, as shown in FIG. 3, retard angle hydraulic chambers 11 and advance angle hydraulic chambers 12 are connected, respectively, to a discharge passage 43a of an oil pump 43 (described later) through a first connection hole 11a and a second connection hole 12a, and a retard angle passage 18 and an advance angle passage 19 which are formed in rotor 15 to extend in the radial direction.

Lock mechanism 4 is arranged to lock vane rotor 9 with respect to housing 7, to a rotational position on the most retard angle side (a position of FIG. 6B), a first intermediate rotational position (a position of FIG. 7B) which is closer to the advance angle (the most advance angle position) between the most retard angle position and the most advance angle position, and a second intermediate rotational position (a position of FIG. 8B) which is closer to the retard angle (the most retard angle position) between the most retard angle position and the most advance angle position.

Figure 10:
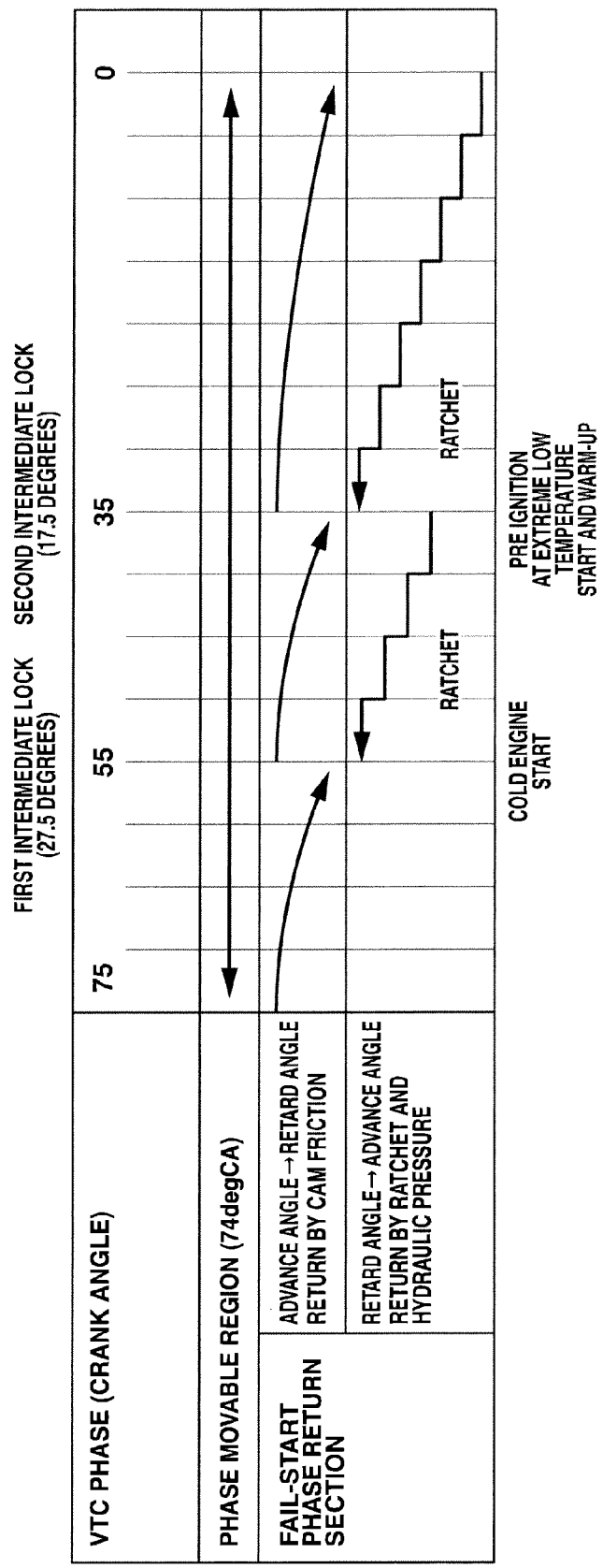
FIG. 10 is a table showing the lock positions of the vane rotor and the angle positions of the vane rotor corresponding to the positions shown in FIGS. 6-8.

As shown in FIG. 10, the rotational position on the most retard angle side is set to an angle position of the crank angle of 0 degree. This rotational position is appropriate for a case in which the engine temperature is equal to or greater than a predetermined temperature by the idling stop (no idling) and so on.

The first intermediate position corresponds to a position at which vane rotor 9 is locked by lock mechanism 4 after the engine stop by the OFF operation of the ignition switch. As shown in FIG. 10, this first intermediate position is set to an angle position of the crank angle of about 55 degrees (VTC phase angle is 27.5 degrees) (in this first intermediate position, the crank angle is set to an angle position of about 55 degrees (VTC phase angle is 27.5 degrees). This rotational position is appropriate for the normal cold engine start.

As shown in FIG. 10, the second intermediate rotational position is set to the angle position of the crank angle of 35 degrees (the VTC phase angle is 17.5 degrees). This rotational position is appropriate for the extreme low temperature start in the cold area and so on.

As shown in FIG. 4 and FIGS. 6-8, lock mechanism 4 includes a first lock mechanism 4a and a second lock mechanism 4b. Lock mechanism 4 includes first to fourth lock holes 24, 25, 26, and 27 (also including a fifth lock recessed portion) which are first to fourth lock recessed portions which are formed on sprocket inner side surface 1c by hole constituting sections at a substantially regular interval in the circumferential direction; first to fourth lock pins 28, 29, 30, and 31 which are first to fourth lock members which are provided to rotor 15 at a substantially regular interval in the circumferential direction, and which are arranged to be engaged with and disengaged from first to fourth lock holes 24, 25, 26, and 27; and first and second lock release passages 41 and 42 which are arranged to release the engagements of first to fourth lock pins 28-31 with first to fourth lock holes 24-27.

First lock mechanism 4a is constituted by first and second lock holes 24 and 25, first and second lock pins 28 and 29, and first lock release passage 41. Second lock mechanism 4b is constituted by third and fourth lock holes 26 and 27, third and fourth lock pins 30 and 31, and second lock release passage 42.

First lock hole 24 is formed into a stepped elongated hole elongated in the circumferential direction. First lock hole 24 includes an uppermost stage which corresponds to sprocket inner side surface 1c. First lock hole 24 has a stepped shape whose depths are increased (heights are decreased) from the retard angle side toward the advance angle side. First lock hole 24 includes a first hole portion 24a which is located on the retard angle side, and which has a shallow arc shape; and a second hole portion 24b which is located on the advance angle side, and which has a deep circular shape. Moreover, first lock hole 24 has an overall shape which is slightly greater than an outside diameter of smaller diameter tip end portion 28a of first lock pin 28. First lock hole 24 is formed so that tip end portion 28a inserted into second hole portion 24a is arranged to be slightly moved in the circumferential direction. Moreover, as described above, first lock hole 24 is formed on inner side surface 1c of sprocket 1 at an intermediate position which is closer to the advance angle side between the most advance angle position and the most retard angle position of vane rotor 9.

Accordingly, when tip end portion 28a of first lock pin 28 is engageably inserted in first hole portion 24a of first lock hole 24 while tip end portion 28a is slidably abutted on sprocket inner side surface 1c in response to the rotation of vane rotor 9 in the advance angle direction, a side edge of tip end portion 28a is abutted on the inner side surface of first hole portion 24a so as to restrict the rotation of vane rotor 9 in the retard angle direction. As shown in FIG. 7A, when tip end portion 28a is abutted on second hole portion 24b, the rotations in the retard angle direction and in the advance angle direction are restricted.

Second lock hole 25 is formed into a stepped elongated hole elongated in the circumferential direction from the retard angle side toward the advance angle side, like first lock hole 24. That is, second lock hole 25 has an uppermost stage which is inner side surface 1c of sprocket 1. Second lock hole 25 includes a first hole portion 25a which has an arc shape, and a second hole portion 25b which has an oval shape. Second lock hole 25 is lowered by one stage from the uppermost stage of sprocket inner side surface 1c in a direction from the retard angle side to the advance angle side. These first and second hole portions 25a and 25b have circumferential lengths larger than those of first and second hole portions 24a and 24b of first lock hole 24.

When tip end portion 29a of second lock pin 29 is engaged with first hole portion 25a, the rotation of vane rotor 9 in the retard angle direction is restricted. When tip end portion 29a is engaged with second hole portion 25b, tip end portion 29a of second lock pin 29 can be slightly moved in the advance angle direction and in the retard angle direction. However, as shown in FIG. 7A, when vane rotor 9 is rotated on the advance angle side, the side edge of tip end portion 29a is abutted on a side surface 25c of second hole portion 25b, so as to restrict the rotation of vane rotor 9 in the retard angle direction and in the advance angle direction in cooperation with first lock pin 28.

Third lock hole 26 is an elongated hole elongated in the circumferential direction. However, third lock hole 26 includes a hole portion 26a which has a flat shape having a constant deepness, and which does not have a stepped shape. Moreover, when tip end portion 30a of third lock pin 30 is engaged with hole portion 26a of third lock hole 26, the slight rotation of vane rotor 15 in the retard angle direction and in the advance angle direction is allowed. On the other hand, as shown in FIG. 8A, a side edge of tip end portion 30a is abutted on a circumferential side surface 26b in accordance with the movement of vane rotor 9 in the retard angle direction by a predetermined angle or more, so as to restrict the rotation of vane rotor 9 in the retard angle direction.

Fourth lock hole 27 is formed into a stepped elongated hole elongated in the circumferential direction, like first lock hole 24. Fourth lock hole 27 includes an uppermost stage which corresponds to inner side surface is of sprocket 1. Fourth lock hole 27 has a stepped shape which is lowered by one from inner side surface 1c of the uppermost stage from the advance angle side toward the retard angle side. Fourth lock hole 27 includes a first hole portion 27a which is a fourth lock recessed portion which has a circular shape; and a second hole portion 27b which is a fifth lock recessed portion. These first and second hole portions 27a and 27b have circumferential lengths substantially identical to those of second lock hole 25.

Figure 8A:
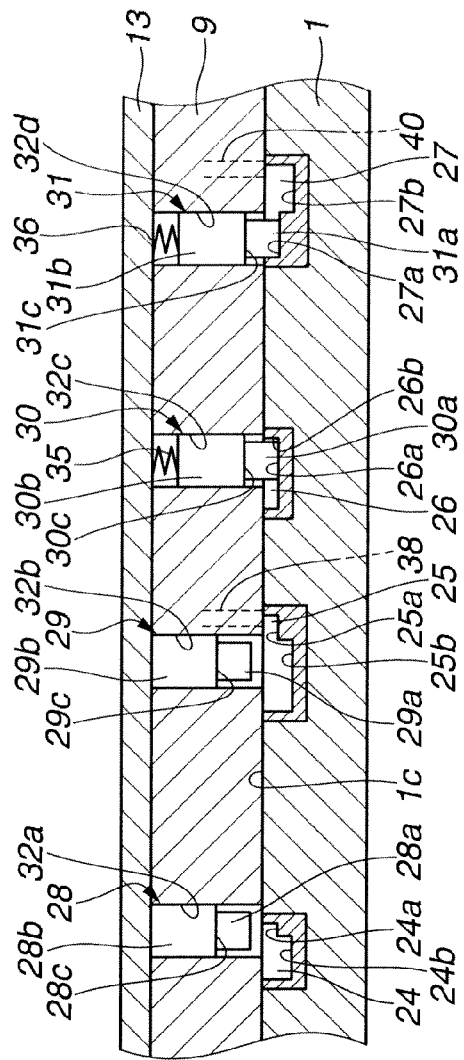
FIG. 8A is a developed sectional view showing operations of the lock pins when the vane rotor is rotated to a second intermediate rotational position.
Figure 8B:
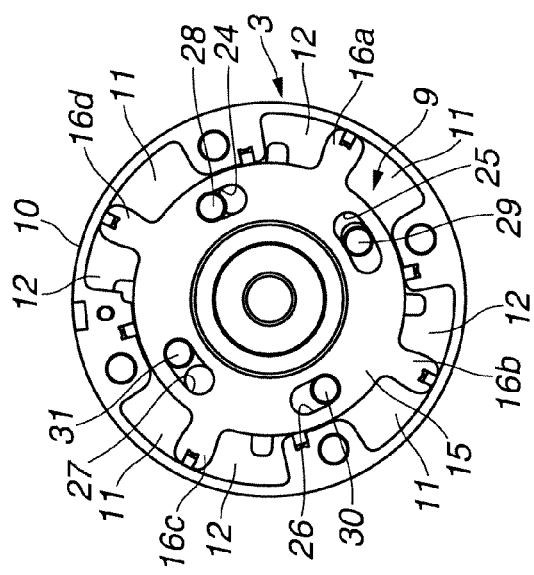
FIG. 8B is a front view showing rotational positions of the vane rotor and the lock pin which is locked.

When tip end portion 31a of fourth lock pin 31 is engaged with first hole portion 27a as shown in FIG. 8A, the movement of vane rotor 9 in the advance angle direction is restricted. At this time, third lock pin 30 is also engaged with third lock hole 26, so as to restrict the rotation of vane rotor 9 in the retard angle direction. Accordingly, vane rotor 9 is restricted at the second intermediate rotational position on the retard angle side through third and fourth lock pins 30 and 31.

Moreover, when tip end portion 31*a* of fourth lock pin 31 is engaged with second hole portion 27*b* of fourth lock hole 27 as shown in FIG. 6A, vane rotor 9 is restricted at the rotational position of the most retard angle side.

As shown in FIG. 2, FIG. 3, and FIGS. 6-8, first lock pin 28 is slidably disposed within first pin hole 32*a* which is formed in a portion of rotor 15 between first and second vanes 16*a* and 16*b*, and which penetrates through in the axial direction. First lock pin 28 includes tip end portion 28*a* which has a small diameter, a large diameter portion 28*b* which has a hollow shape, and which is located on a rear side of tip end portion 28*a*, and a stepped pressure receiving surface 28*c* which is formed between tip end portion 28*a* and large diameter portion 28*b*. First lock pin 28 is integrally formed by tip end portion 28*a*, large diameter portion 28*b*, and stepped pressure receiving surface 28*c*. Tip end portion 28*a* includes a flat tip end surface which is arranged to be closely abutted on first hole portion 24*a* of first lock hole 24.

Moreover, this first lock pin 28 is urged in a direction in which first lock pin 28 is engaged with first lock hole 24, by a spring force of a first spring 33 which is an urging member which is elastically disposed between a recessed hole portion inside large diameter portion 28*b*, and an inner surface of front plate 13.

Furthermore, as shown in FIGS. 6A and 7A, the hydraulic pressure is acted to stepped pressure receiving surface 28*c* of first lock pin 28 from a first passage hole 37 formed inside rotor 15 through first lock hole 24. By this hydraulic pressure, first lock pin 28 is moved in the rearward direction (in the upward direction in FIGS. 6A and 7A) against the spring force of first spring 33, so that the engagement with the first lock hole 24 is released.

Second lock pin 29 is slidably disposed within a second pin hole 32*b* which is formed in a portion of rotor 15 between second vane 16*b* and third vane 16*c*, and which penetrates in the axial direction, like first lock pin 28. Second lock pin 29 has an outer shape which is a stepped shape, like first lock pin 28. Second lock pin 29 includes a tip end portion 29*a* which has a smaller diameter, a large diameter portion 29*b* which has a hollow shape, and a stepped pressure receiving surface 29*c*. Second lock pin 29 is integrally formed from tip end portion 29*a*, large diameter portion 29*b*, and stepped pressure receiving surface 29*c*. Tip end portion 29*a* of second lock pin 29 includes a tip end surface which is closely abutted on hole portions 25*a* and 25*b* of second lock hole 25.

This second lock pin 29 is urged in a direction in which second lock pin 29 is engaged with second lock hole 25, by a spring force of a second spring 34 which is an urging member which is elastically disposed between inner surface of front plate 13, and a recessed groove hole portion formed in large diameter portion 29*b* from the rear end side of large diameter portion 29*b* in the axial direction.

Moreover, the hydraulic pressure is acted to stepped pressure receiving surface 29*c* of second lock pin 29 from a second passage hole 38 formed in rotor 15. By this hydraulic pressure, second lock pin 29 is moved in the rearward direction against the spring force of second spring 34, so as to release the engagement with the second lock hole 25.

Third lock pin 30 is slidably disposed within a third pin hole 32*c* formed in a portion of rotor 15 between third vane 16*c* and fourth vane 16*d*, and which penetrates in the axial direction. Third lock pin 30 has an outer shape having a stepped shape. Like first lock pin 28, third lock pin 30 includes a tip end portion 30*a* which has a small diameter, large diameter portion 30*b* which has a hollow shape, and a stepped pressure receiving surface 30*c*. Third lock pin 30 is integrally constituted by tip end portion 30*a*, large diameter portion 30*b*, and stepped pressure receiving surface 30*c*. Tip end portion 30*a* of third lock pin 30 includes a tip end surface which is closely abutted on a bottom surface of hole portions 26*a* of third lock hole 26.

Moreover, this third lock pin 30 is urged in a direction in which third lock pin 30 is engaged with third lock hole 26, by a spring force of a third spring 35 which is an urging member which is elastically disposed between the inner surface of front plate 13, and a recessed groove hole portion formed in large diameter portion 30*b* from the rear end side in the axial direction.

Furthermore, the hydraulic pressure is acted to stepped pressure receiving surface 30*c* of third lock pin 30 from a third passage hole 39 formed in rotor 15. By this hydraulic pressure, third lock pin 30 is moved in the rearward direction against the spring force of third spring 35, so as to release the engagement with third lock hole 26.

Fourth lock pin 31 is slidably disposed within a fourth pin hole 32*d* which is formed at a portion of rotor 15 between fourth vane 16*d* and first vane 16*a*, and which penetrates in the axial direction. Fourth lock pin 31 has an outer shape having a stepped shape. Like first lock pin 28, fourth lock pin 31 includes a tip end portion 31*a* which has a small diameter, a large diameter portion 31*b* which has a hollow shape, and a stepped pressure receiving surface 31*c*. Fourth lock pin 31 is integrally formed by tip end portion 31*a*, large diameter portion 31*b*, and stepped pressure receiving surface 31*c*. Tip end portion 31*a* of fourth lock pin 31 includes a flat tip end surface which is arranged to be closely abutted on the bottom surfaces of hole portions 27*a* and 27*b* of fourth lock hole 27.

Fourth lock pin 31 is urged in a direction in which fourth lock pin 31 is engaged with fourth lock hole 27 by a spring force of a fourth spring 36 which is an urging member which is elastically disposed between the inner surface of front plate 13, and a recessed groove hole portion formed in large diameter portion 31*b* from the rear end side in the axial direction.

Furthermore, the hydraulic pressure is acted to stepped pressure receiving surface 31*c* of fourth lock pin 31 from a fourth passage hole 40 formed in rotor 15. By this hydraulic pressure, fourth lock pin 31 is moved in the rearward direction against the spring force of fourth spring 36, so as to release the engagement with fourth lock hole 27.

Besides, the pressure receiving areas of stepped pressure receiving surfaces 28*c*-31*c* including the tip end surfaces of first to fourth lock pins 28-31 are set to the identical area.

Figure 4:
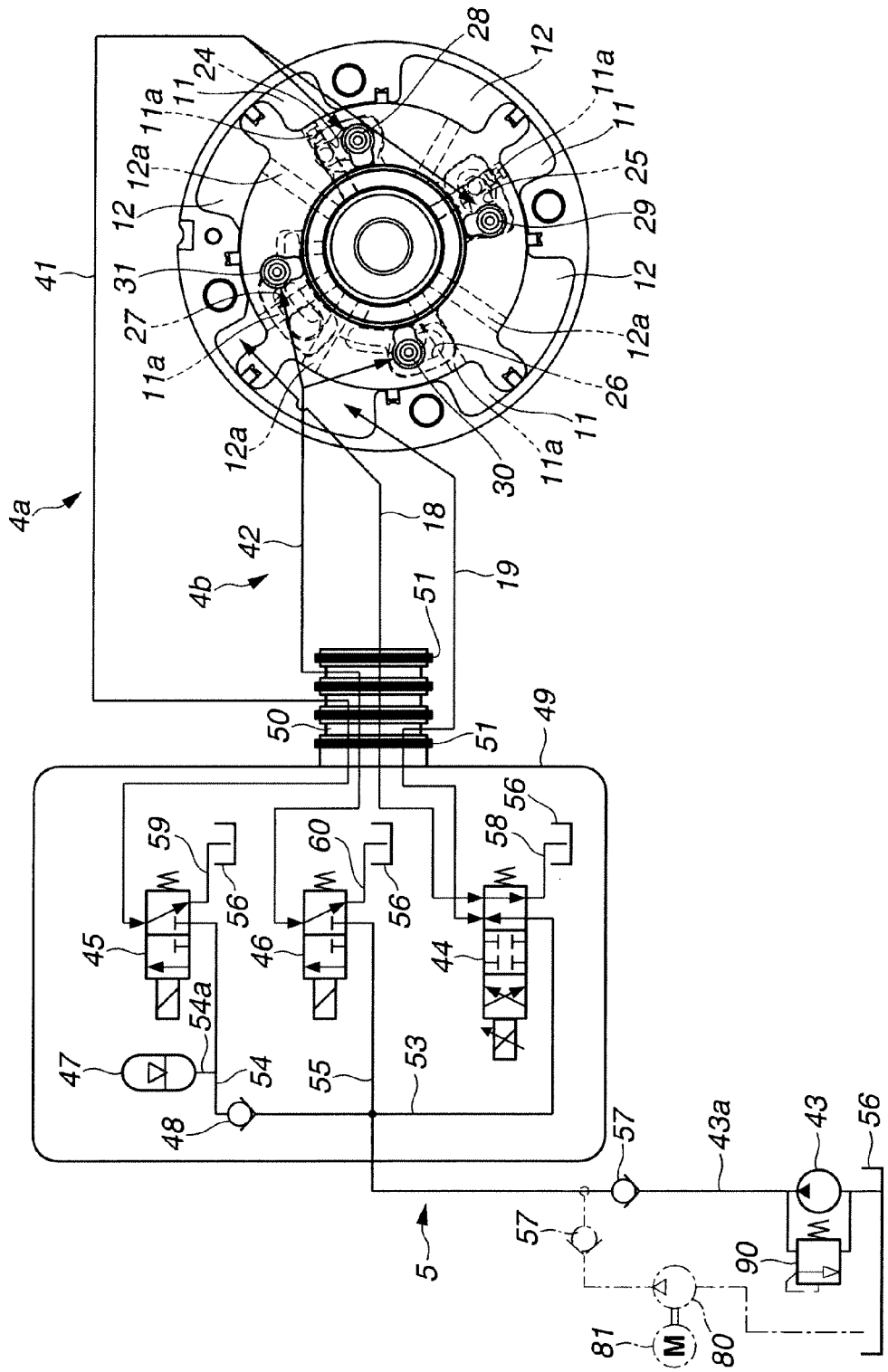
FIG. 4 is a schematic view showing a hydraulic circuit in the valve timing control system of FIG. 1.

Moreover, as shown in FIG. 4, first and second passage holes 37 and 38 are connected with first lock release passage 41 described later. On the other hand, third and fourth passage holes 39 and 40 are connected with second lock release passage 42.

With this, as shown in FIG. 10, vane rotor 9 is relatively rotated in the advance angle direction while the rotation in the retard angle direction is restricted as a whole by four stepped ratchet functions. Finally, vane rotor 9 is held at an intermediate position between the most retard angle phase and the most advance angle phase.

First to third pin holes 32*a*-32*d* include, respectively, breath grooves 52 each of which is formed on an edge of the hole on the front plate 13's side, and which is connected to the atmosphere to ensure the good slidability of lock pins 28-31.

As shown in FIG. 1 and FIG. 4, hydraulic circuit 6 includes retard angle passage 18 which is arranged to supply and discharge the hydraulic pressure through first connection passages 11a to and from retard angle hydraulic chambers 11; advance angle passage 19 which is arranged to supply and discharge the hydraulic pressure through second connection passages 12a to advance angle hydraulic chambers 12; first and second lock release passages 41 and 42 arranged to supply and discharge the hydraulic pressure to and from first to fourth passage holes 37-40; oil pump 43 which is a fluid pressure supply source that is arranged to supply the hydraulic fluid to retard and advance angle passages 18 and 19 selectively, and to supply the hydraulic fluid through discharge passage 43a to first and second lock release passages 41 and 42; a first electromagnetic switching valve 44 which is arranged to selectively switch flow passages of retard angle passage 18 and advance angle passage 19 in accordance with the driving state of the engine; a second electromagnetic switching valve 45 which is arranged to switch the supply and the discharge of the hydraulic fluid to and from first lock release passage 41 in an ON-OFF manner; a third electromagnetic switching valve 46 which is arranged to switch the supply and the discharge of the hydraulic fluid to and from second lock release passage 42; and an accumulator 47 which is disposed on the upstream side of second electromagnetic switching valve 45, and which stores the hydraulic pressure inside accumulator 47; and a check valve 48 which is provided on the upstream side of accumulator 47, and which is arranged to allow the flow of the discharge hydraulic pressure discharged from oil pump 43 in a direction toward accumulator 47.

As shown in FIG. 1 and FIG. 4, parts of retard angle passage 18, advance angle passage 19, and first and second lock release passages 41 and 42 are formed in the inside of chain cover 49 attached to the cylinder block of the internal combustion engine, and the inside of passage constituting section 50 which is a cylindrical shape, and which is integrally formed with chain cover 49.

Passage constituting section 50 is inserted and fixed in fixing portion 15a of rotor 15. Passage constituting section 50 includes a plurality of annular grooves formed on the outer circumference. Four seal members 51 are mounted and fixed in the annular grooves. These four seal members 51 are arranged to seal portions between the passages and the outside.

Retard angle passage 18 and advance angle passage 19 include, respectively, one end portions connected with ports (not shown) of first electromagnetic switching valve 44, and the other end portion connected through first and second connection passages 11a and 12a to retard angle hydraulic chambers 11 and advance angle hydraulic chambers 12.

As shown in FIG. 1 and FIG. 4, first lock release passage 41 includes one end portion connected to a lock port (not shown) of second electromagnetic switching valve 45, and the other end portion connected through first and second passage holes 37 and 38 to stepped pressure receiving surfaces 28c and 29c of lock pins 28 and 29.

On the other hand, second lock release passage 42 includes one end portion connected to a lock port (not shown) of third electromagnetic switching valve 46, and the other end portion connected through third and fourth passage holes 39 and 40 to stepped pressure receiving surfaces 30c and 31c of lock pins 30 and 31.

Oil pump 43 is a general pump such as a trochoid pump arranged to drivingly rotated by a crank shaft of the engine. Oil pump 43 is arranged to suck the hydraulic fluid in an oil pan 56 through a suction passage by the rotation of outer and inner rotors, and to discharge the sucked hydraulic fluid to discharge passage 43a. A part of the discharged hydraulic fluid is supplied from a main oil gallery M/G (not shown) to sliding portions of the internal combustion engine. The residual of the hydraulic fluid is supplied through first to third branch passages 53, 54, and 55 to first to third electromagnetic switching valves 44-46.

Besides, there is provided a filter (not shown) located on the downstream side of discharge passage 43a. Moreover, there is provided a check valve 57 located on the downstream side of discharge passage 43a, and arranged to allow the flow of the discharged hydraulic pressure only in a direction toward branch passages 53-55. Moreover, there is provided a flow rate control valve 90 which is arranged to return the excessive hydraulic fluid discharged from discharge passage 43a though the drain passage to the oil pan, and thereby to control to the appropriate flow rate.

As shown in FIG. 4, first electromagnetic switching valve 44 is a valve with four ports and three ways. Schematically, first electromagnetic switching valve 44 includes a valve body which has a substantially cylindrical shape; a spool valve element which is disposed within the valve body to be slid in the axial direction; a valve spring which is an urging member that is provided within the valve body on the one end side, and that is arranged to urge the spool valve in one direction; and an electromagnetic coil which is provided on the one end portion of the valve body, and which is arranged to move the spool valve in the other direction against the spring force of the valve spring.

Figure 5A:
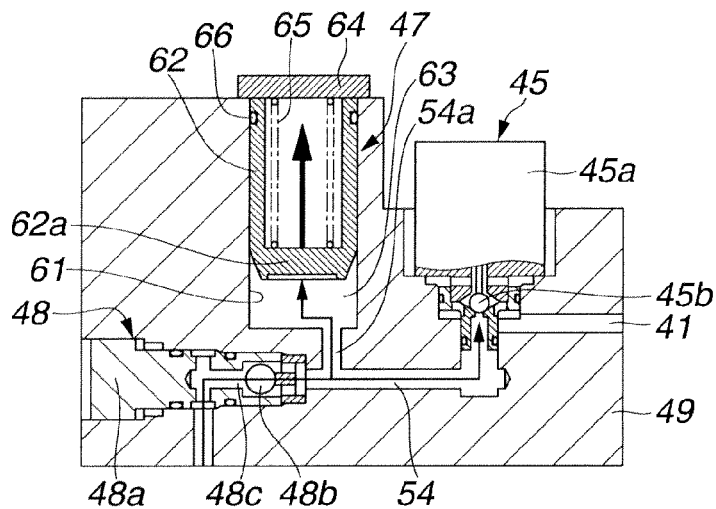
FIGS. 5A-5C are views showing an accumulator, a second electromagnetic switching valve, and a check valve in the valve timing control system of FIG. 1.
Figure 5B:
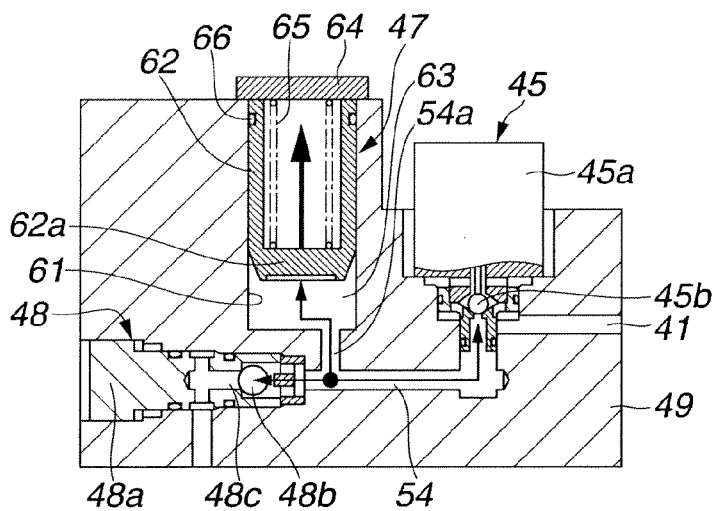
Figure 5C:
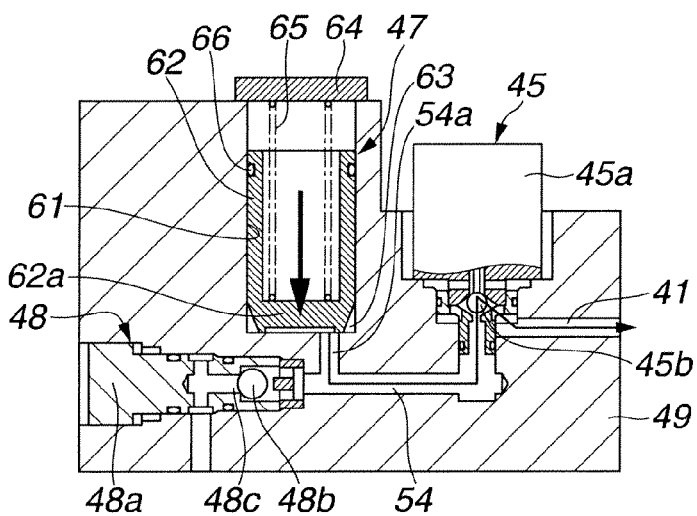

Second electromagnetic switching valve 45 is a general valve with three ports and three ways. As shown in FIGS. 5A-5C, second electromagnetic switching valve 45 includes a valve body 45a, a ball valve element 45b, a valve spring (not shown), an electromagnetic coil (not shown), a fixed iron core (not shown), and a movable plunger (not shown). Second electromagnetic switching valve 45 is arranged to control to relatively switch second branch passage 54 and second drain passage 59 with respect to first lock release passage 41.

Third electromagnetic switching valve 46 is a valve with three ports and three ways, like second electromagnetic switching valve 45. Third electromagnetic switching valve 46 is arranged to control to relatively switch third branch passage 55 and a third drain passage 60 with respect to second lock release passage 42.

Accumulator 47 is provided in the middle of second branch passage 54. As shown in FIGS. 5A-5C, accumulator 47 includes a cylinder 61 which has a cylindrical shape, and which is formed within chain cover 49; a piston 62 which has a hollow cylindrical shape having a bottom, and which is slidably disposed within cylinder 61; an accumulator chamber 63 which is formed between an inner bottom surface of cylinder 61, and a bottom wall 62a of piston 62; a cover member 64 arranged to liquid-tightly close an opening end of accumulator chamber 63; a spring member 65 which is elastically disposed between the inner bottom surface of piston 62 and cover member 64, and which is arranged to urge the hydraulic pressure within accumulator chamber 63 through piston 62 in a direction in which the hydraulic pressure within accumulator chamber 63 is compressed; and a seal ring 66 which is provided on the outer circumference of piston 62, and which is arranged to seal the inside of accumulator chamber 63.

Accumulator chamber 63 includes a bottom portion connected to an end portion of a branch passage 54a bifurcated from second branch passage 54.

Seal ring 66 is mounted and fixed in an annular groove formed in the outer circumference of piston 52 at a position closer to cover member 64. Accordingly, seal ring 66 is provided at a position sufficiently apart from accumulator chamber 63. Consequently, seal ring 66 does not directly receive the high hydraulic pressure within accumulator chamber 63. The hydraulic pressure is acted to seal ring 62 through a minute gap between the inner circumference surface of cylinder 61 and the outer circumference surface of piston 62. Accordingly, the durability of seal ring 62 is improved.

Moreover, as shown in FIG. 1, a part of the downstream portion of first lock release passage 41 does not pass through a space 15e formed between a bolt head portion 8a within holding hole 15d, and the tip end portion of passage constituting portion 50. This part of the downstream portion of first lock release passage 41 is constituted by a small diameter passage 41a formed within passage constituting section 50. With this, the volume of accumulator chamber 63 is not affected by avoiding space portion 15e in this way. That is, the volume of accumulator chamber 63 does not need to be set to the large volume in consideration of space portion 15e.

As shown in FIGS. 5A-5C, in check valve 48, ball valve element 48b is arranged to open and close an inside opening end 48c of a passage hole 48a formed within valve body 48. With this, check valve 48 pass the discharged hydraulic pressure from oil pump 43 toward accumulator 47, and prevents the flow of the hydraulic pressure in a direction from accumulator 47 toward oil pump 43. Accordingly, as shown in FIG. 5A, the hydraulic pressure is supplied from discharge passage 43a through second branch passage 54 and check valve 48 to accumulator 47 during the operation of oil pump 43. With this, piston 62 is moved in the rearward direction (upward direction in FIGS. 5A-5C) against the spring force of spring member 65, so as to store the high hydraulic pressure in accumulator chamber 63.

Accordingly, as shown in FIG. 4 and FIG. 5A, in accumulator 47, the hydraulic pressure discharged to discharge passage 43a during the operation of oil pump 43 presses and opens ball valve element 48b of check valve 48, so that the hydraulic pressure discharged to discharge passage 43a is supplied through branch passage 54a to accumulator chamber 63. With this, piston 62 is moved in the rearward direction against the spring force of spring member 65, so that the high hydraulic pressure is stored in accumulator chamber 63.

Moreover, when the operation of oil pump 43 is stopped, ball valve element 48b of check valve 48 closes the opening end of the passage by the high hydraulic pressure within accumulator chamber 63 as shown in FIG. 5B, so as to prevent the reverse flow of the hydraulic pressure from accumulator chamber 63. Besides, at this time, an electronic controller (not shown) outputs an OFF signal to second electromagnetic switching valve 45, so that ball valve element 45b prevents the flow of the hydraulic pressure within first branch passage 54.

Moreover, in this state, when an ON signal is outputted to second electromagnetic switching valve 45, ball valve element 45b is opened as shown in FIG. 5C. The high hydraulic pressure stored within accumulator chamber 63 is transmitted through first branch passage 54 to first lock release passage 41.

First to third electromagnetic switching valves 44-46 are controlled by a control current outputted from the electronic controller (ECU) (not shown) and a relative pressure with respect to the valve spring.

First electromagnetic switching valve 44 is arranged to move the spool valve to a predetermined position in the forward direction and in the rearward direction by the energization (applying the current) (including the energization amount) and the deenergization (shut off the apply of the current) from the electronic controller, and thereby to perform the switching of retard angle passage 18 and advance angle passage 19 with respect to first branch passage 53, and the switching among retard angle passage 18, advance angle passage 19, and drain passage 58.

That is, in the deenergized sate, the both retard angle passage 18 and advance angle passage 19 are connected to drain passage 58. Moreover, in the energized state, in accordance with the energization amount, the both retard angle passage 18 and advance angle passage 19 are connected to first branch passage 53, or one of retard angle passage 18 and advance angle passage 19 is connected to first branch passage 53 and at the same time the other of retard angle passage 18 and advance angle passage 19 is connected to drain passage 58.

On the other hand, second and third electromagnetic switching valves 45 and 46 are arranged to move the ball valve elements in one direction (to the one side or the other side) by an ON-OFF energization signal from the electronic controller, and thereby to selectively switch first and second lock release passages 41 and 42 and discharge passage 43a, or first and second lock release passages 41 and 42 and drain passages 59 and 60.

In this way, in first electromagnetic switching valve 44, the spool valve is moved to a predetermined axial position, and accordingly the ports are selectively switched to vary the relative rotational angle of vane rotor 9 with respect to timing sprocket 1. On the other hand, in second and third electromagnetic switching valves 45 and 46, first and second lock pins 28 and 29, and third and fourth lock pins 30 and 31 are selectively engageably inserted in lock holes 24-27, and released from the lock with lock holes 24-27, so as to lock vane rotor 9 at the most retard angle position and the first and second intermediate phase positions, and to allow the free rotation of vane rotor 9.

The electronic controller includes an internal computer arranged to receive information signals from various sensors such as a crank angle sensor (detection of engine speed), an air flow meter, an engine water temperature sensor, an engine temperature sensor, a throttle valve opening degree sensor, and a cam angle sensor arranged to sense a current rotational phase of cam shaft 2, and to sense the current engine driving state. As described above, the electronic controller outputs a control current to the electromagnetic coils of first to third electromagnetic switching valves 44-46 to control the movement positions of the valve elements, and thereby to control to selectively switch the ports.

The electronic controller outputs the control current to second and third electromagnetic switching valves 45 and 46 respectively, when the engine is stopped by the OFF operation of the ignition switch of the vehicle, and when the engine is temporarily stopped at the idling stop and so on at the running of the vehicle.

[Operation of this Embodiment]

Hereinafter, the operation of the valve timing control apparatus according to this embodiment of the present invention is illustrated below. First, a case in which the engine is stopped by the OFF operation of the ignition switch after the normal running of the vehicle is illustrated.

When the ignition switch is operated to the OFF state, the electronic controller deenergizes first to third electromagnetic switching valves 44-46. Accordingly, the valve elements are moved to the positions in the one direction by the spring forces of the valve springs. With this, both retard angle passage 18 and advance angle passage 19 are connected to discharge passage 43a, and furthermore lock release passages 41 and 42 are connected to drain passages 59 and 60. Moreover, the driving of oil pump 43 is stopped. Accordingly, the supply to one of hydraulic pressure chambers 11 and 12, and first to fourth passage holes 37-40 are stopped.

Then, at the idling operation before this OFF operation of the ignition switch, discharge passage 43a is connected to retard angle passage 18 by the energization to first electromagnetic switching valve 44, and advance angle passage 19 is connected to drain passage 58. At this time, the ON signal is continuously outputted to second and third electromagnetic switching valves 45 and 46. With this, the hydraulic pressure of accumulator 47 is acted from first lock release passage 41 through first and second passage holes 37 and 38 to stepped pressure receiving surfaces 28c and 29c of first and second lock pins 28 and 29. Moreover, the hydraulic pressure of oil pump 43 is acted from third and fourth passage holes 39 and 40 to stepped pressure receiving surfaces 30c and 31c of third and fourth lock pins 30 and 31. With this, lock pins 28-31 are moved out from the positions of first to fourth lock holes 24-27, and the lock of vane rotor 9 is released.

Accordingly, vane rotor 9 is held to the state in which the lock is released. Vane rotor 9 is positioned at the rotational position on the most retard angle side by the hydraulic pressure supplied to retard angle hydraulic chambers 11.

In this state, when the ignition switch is operated to the OFF state, at the accessary mode of the initial state of the operation, the energization to first electromagnetic switching valve 44 is shut off (first electromagnetic switching valve 44 is deenergized), retard angle passage 18 and advance angle passage 19 are connected to drain passage 58. Consequently, retard angle hydraulic chambers 11 also become the low pressure state.

Then, at the timing immediately before this stop of the engine, the positive and negative alternative torques acted to cam shaft 2 are generated. In particular, vane rotor 9 is slightly moved from the most retard angle position toward the advance angle side by the negative torque. At this time, the energization to second and third electromagnetic switching valves 45 and 46 are stopped. Accordingly, drain passages 59 and 60 are connected to lock release passages 41 and 42. With this, the supply of the release hydraulic pressures from passage holes 37-40 to lock pins 28-31 are blocked. Accordingly, these lock pins 28-31 are urged in the forward directions by the spring forces of springs 33-36.

Therefore, lock pins 28-31 are moved in the leftward direction of the drawings while tip end portions 28a-31a of lock pins 28-31 are slidably abutted on sprocket inner side surface 1c in accordance with the rotation of vane rotor 9 in the advance angle direction from the position of FIG. 6A (in a state in which fourth lock pin 31 is not engaged with fourth lock hole 27). First, the tip end portion of second lock pin 29 is engaged from sprocket inner side surface 1c with first hole portion 25a of second lock hole 25. With this, the rotation of vane rotor 9 in the retard angle direction is restricted even when the alternating torque on the retard angle side is acted to vane rotor 9.

Next, when the alternating torque in the advance angle direction is acted and vane rotor 9 is further rotated in the advance angle direction, tip end portion 28a of first lock pin 28 is once engaged with first hole portion 24a of first lock hole 24. Then, as shown in FIG. 7A, tip end portion 28a of first lock pin 28 is stepped down on second hole portion 24b and engaged with second hole portion 24b. Moreover, second lock pin 29 is similarly stepped down on second hole portion 25b of second lock hole 25 and engaged with second hole portion 25b of second lock hole 25. Then, second lock pin 29 is slid on the advance angle side within second hole portion 25b. At the same time, third lock pin 30 is slid on the advance angle side while third lock pin 30 is engaged with hole portion 26a of corresponding third lock hole 26.

With this, as shown in FIG. 7A, vane rotor 9 is disposed to be engaged to sandwich a portion between first and second lock holes 24 and 25 by first and second lock pins 28 and 29. Accordingly, at this time, the alternating torque in the positive direction is acted to vane rotor 9, vane rotor 9 is likely to be rotated on the retard angle side. However, the side edge of tip end portion 28a of first lock pin 28 is abutted on the upright stepped surface of second hole portion 24b, and the rotation of vane rotor 9 in the retard angle direction is restricted. On the other hand, the alternating torque in the negative direction to vane rotor 9 is acted, even when vane rotor 9 is likely to be rotated in the advance angle direction, the side edge of tip end portion 29a of second lock pin 29 is abutted on the upright stepped surface 25c of second hole portion 25b so as to restrict the rotation of vane rotor 9 in the advance angle direction.

Accordingly, vane rotor 9 is locked and held at the intermediate rotational phase position nearer to the advance angle position (the most advance angle position), that is, a first intermediate phase position at which the VTC phase is about 27.5 degrees as shown in FIGS. 9 and 10. This first intermediate rotational position is a position appropriate for the normal cold start.

Besides, in this state, as shown in FIG. 7A, tip end portion 31a of fourth lock pin 31 is elastically abutted, by the spring force of spring 36, on the hole edge of fourth lock hole 27, that is, on sprocket inner side surface 1c.

Then, when the ignition switch is brought to the ON state for starting the engine (low temperature start) after the long time period elapsed, oil pump 43 is driven by the initial combustion (the start of the cranking) at the timing immediately after that time. Moreover, first electromagnetic switching valve 44 is energized, and discharge passage 43a is connected to both retard angle passage 18 and advance angle passage 19. Accordingly, the pump discharge hydraulic pressure is supplied through retard angle passage 18 and advance angle passage 19 to retard angle hydraulic chambers 11 and advance angle hydraulic chambers 12.

On the other hand, first and second lock release passages 41 and 42 are connected to drain passages 59 and 60. Accordingly, lock pins 28-30 are held to be engaged with lock holes 24-26 by the spring forces of springs 33-35.

Accordingly, vane rotor 9 is held to the first intermediate rotational phase position. Consequently, the combustion at the cranking is improved. Therefore, the exhaust gas emission characteristic is improved. Moreover, the startability (start-up performance) is improved.

Next, when it is proceeded from the idling operation, for example, to the engine normal driving region, the electronic controller outputs the control current to second and third electromagnetic switching valves 45 and 46. Consequently, branch passages 54 and 55 are connected with lock release passages 41 and 42. Moreover, a predetermined current is outputted to first electromagnetic switching valve 44, so that discharge passage 43a is selectively connected to retard angle passage 18 and advance angle passage 19.

Accordingly, in lock mechanism 4, the hydraulic pressures flowing from branch passages 54 and 55 through lock release passages 41 and 42 and passage holes 37-40 are acted to stepped pressure receiving surfaces 28c-31c of lock pins 28-31, so that lock pins 28-31 are moved (pulled) out from lock holes 24-27 to release the engagements. Consequently, the free rotation of vane rotor 9 in the positive and negative directions are allowed. Moreover, vane rotor 9 is relatively rotated to the advance angle side or the retard angle side in accordance with the engine driving state, by the selective supply of the hydraulic pressure to retard angle hydraulic chambers 11 and advance angle hydraulic chambers 12. With this, it is possible to sufficiently get the engine performance such as the fuel economy and the output of the engine.

That is, when the vehicle is proceeded, for example, to the normal driving region of the engine, first electromagnetic switching valve 44 is energized so that discharge passage 43a is connected to retard angle passage 18, and so that drain passage 58 is connected to advance angle passage 19.

On the other hand, second and third electromagnetic switching valves 45 and 46 are energized, so that branch passages 54 and 55 are connected to lock passages 41 and 42. With this, lock pins 28-31 are held to the state in which lock pins 28-31 are moved (pulled) out from lock holes 24-27. On the other hand, by the switching control of first electromagnetic switching valve 44, for example, the hydraulic pressure is discharged from advance angle hydraulic chambers 12, so that advance angle hydraulic chambers 12 become the low pressure. On the other hand, retard angle hydraulic chambers 11 become the high pressure. Accordingly, vane rotor 9 is rotated to the retard angle side with respect to housing 7.

Accordingly, the valve overlap between the intake valve and the exhaust valve becomes small, so that the residual gas within the cylinder is decreased. Accordingly, the combustion efficiency is improved. It is possible to stabilize the rotation of the engine, and to improve the fuel economy.

Then, for example, when the vehicle is proceeded to the high speed and high load region of the engine, the energization amount to first electromagnetic switching valve 44 is increased. With this, retard angle passage 18 and drain passage 58 are connected with each other. Moreover, advance angle passage 19 and discharge passage 43a are connected with each other. Furthermore, the energization state of second and third electromagnetic switching valves 45 and 46 are held, so that lock release passages 41 and 42 are held to be connected to branch passages 54 and 55.

Accordingly, lock pins 28-31 are released from the engagements with lock holes 24-27. Moreover, retard angle hydraulic chambers 11 become the low pressure. On the other hand, advance angle hydraulic chambers 12 become the high pressure. Accordingly, vane rotor 9 is rotated on the most advance angle side with respect to housing 7. With this, cam shaft 2 is converted to the relative rotational phase of the most advance angle with respect to sprocket 1.

With this, the valve overlap between the intake valve and the exhaust valve becomes large. Accordingly, the charging efficiency of the intake air becomes high. Consequently, it is possible to improve the output torque of the engine.

In this way, the electronic controller energizes or deenegizes first to third electromagnetic switching valves 44-46 in accordance with the driving states of the engine. With this, phase varying mechanism 3 and lock mechanism 4 are controlled so as to control cam shaft 2 to the appropriate relative rotational position with respect to timing sprocket 1. Accordingly, it is possible to improve the control accuracy of the valve timing.

[When Engine is Automatically Stopped]

When the engine is automatically stopped by the idling stop and so on, similarly to a case in which the engine is stopped by the operation of the ignition switch, discharge passage 43a and retard angle passage 18 are connected with each other through first electromagnetic switching valve 44 at the idling rotation before the automatic stop of the engine. Moreover, advance angle passage 19 and drain passage 58 are connected with each other through first electromagnetic switching valve 44. At the same time, lock release passages 41 and 42 and drain passage 59 and 60 are connected with each other through second and third electromagnetic switching valves 45 and 46. Accordingly, the hydraulic pressure is supplied to retard angle hydraulic chambers 11, so that vane rotor 9 is positioned at the rotational position on the most retard angle side, as shown in FIG. 6B.

At this time, in lock mechanism 4, the hydraulic pressure is not supplied to passage holes 37-40. Accordingly, tip end portions 28a-30a of first to third lock pins 28-30 are pulled out from first to third lock holes 24-26 as shown in FIG. 6A, and elastically abutted on inner side surface 1c of sprocket 1 by the urging forces of springs 33-35. Moreover, tip end portion 31a of fourth lock pin 31 is engaged, by the spring force of spring 36, with second hole portion 27b of fourth lock hole 27 which is a fifth lock recessed portion.

With this, vane rotor 9 is surely and stably locked at the rotational position on the most retard angle side. Accordingly, at the subsequent automatic restart of the engine (the initial stage of the cranking), the engine is started in a state in which the intake valve is positioned at the most retard angle phase. Accordingly, the effective compression ratio of the combustion chamber is decreased. Consequently, it is possible to sufficiently suppress the vibration of the engine while the good startability is ensured. Moreover, it is possible to attain the good startability and to suppress the vibration of the engine while the generation of the pre ignition (knocking) is suppressed.

Besides, after the automatic start of the engine, as described above, second and third electromagnetic switching valves 45 and 46 are energized, so that branch passages 54 and 55, and lock release passages 41 and 42 are connected with each other. Accordingly, first to fourth lock pins 28-31 are pulled out from lock holes 24-27 to release the engagements. With this, it is possible to ensure the free rotation of vane rotor 9 in the positive and negative directions.

[At Extreme Low Temperature Engine Start]

Next, a case in which the engine is in the extreme low temperature state at the restart in the extreme cold area of the temperature circumstance at the stop of the engine is illustrated.

After the engine is stopped after the OFF operation of the ignition switch, in vane rotor 9, in particular, first and second lock pins 28 and 29 are engaged with first and second lock holes 24 and 25 as shown in FIGS. 7A and 7B, and vane rotor 9 is held at the first intermediate rotational phase position.

Accordingly, when the ignition switch is brought to the ON state for the restart of the engine, during the accessory mode, when the electronic controller sensing the current engine temperature judges that the engine is in the extreme low temperature state in which the engine temperature is equal to or smaller than a predetermined temperature, the electronic controller outputs the ON signal only to second electromagnetic switching valve 45.

With this, second branch passage 54 and first lock release passage 41 are connected with each other. At the same time, the high hydraulic pressure within accumulator 47 flows from second branch passage 54 through first lock release passage 41, and is immediately acted from first and second passage holes 37 and 38 to stepped pressure receiving surfaces 28c and 29c. Accordingly, tip end portions 28a and 29a of first lock pin 28 and second lock pin 29 are immediately moved out from first and second lock holes 24 and 25, as shown in FIG. 8A, so as to release the lock of vane rotor 9.

Next, when the rotational force in the retard angle direction is acted to vane rotor 9 by the friction torque acted to cam shaft 2 at the first combustion of the cranking, tip end portion 30a of third lock pin 30 which is urged in the forward direction by the spring force of spring 35 is slid within third lock hole 26, and abutted on the side wall on the retard angle side, so that the further rotation of vane rotor 9 (third lock pin 30) in the retard angle direction is restricted. Moreover, tip end portion 31a of fourth lock pin 31 is engaged with first hole portion 27a of fourth lock hole 27. Consequently, both lock pins 30 and 31 sandwiches the portion between lock holes 26 and 27. With this, vane rotor 9 is surely held and locked at this rotational position, that is, the second intermediate rotational position. This rotational position is about 17.5 degrees of the VTC angle as shown in FIG. 9 and FIG. 10, and is appropriate for the extreme low temperature start.

Accordingly, at the start of the engine at the extreme low temperature, when the cranking is started by the ON operation of the ignition switch, the combustion characteristics from the first explosion to the complete combustion (explosion) becomes good. Therefore, it is possible to improve the startability at the extreme low temperature.

As described above, in this embodiment, at the normal low temperature start of the engine, vane rotor 9 is held at the first intermediate rotational phase which is about 27.5 degrees of the VTC angle by first and second lock mechanisms 4a and 4b. Moreover, at the idling stop, vane rotor 9 can be held on the most retard angle side. Accordingly, it is possible to improve the startability.

Moreover, at the extreme low temperature start, the high hydraulic pressure of accumulator 47 of first lock mechanism 4a is forcibly supplied to first lock release passage 41, so that first and second lock pins 28 and 29 can be rapidly moved out from first and second lock holes 24 and 25 (moved in the rearward direction) so as to release the lock.

Accordingly, it is possible to rapidly release the lock by lock mechanism 4, irrespective of the circumstance at the start, in the any starts, specifically even in the extreme low temperature start in which the viscosity of the hydraulic pressure becomes high.

Accumulator 47 is disposed at a position which is sufficiently downstream side of oil pump 43, and which is closer to first and second lock holes 24 and 25. Accordingly, it is possible to rapidly supply the high hydraulic pressure within accumulator 47 to lock holes 24 and 25, and thereby to improve the response of the releases of the locks of first and second lock pins 28 and 29.

Moreover, in this embodiment, the electronic controller energizes second and third electromagnetic switching valves 45 and 46, so that accumulator 47 (second branch passage 54) and discharge passage 43a (third branch passage 55), and lock release passages 41 and 42 are connected with each other. Consequently, the hydraulic pressure supplied from oil pump 43 and accumulator 47a to lock release passages 41 and 42 is simultaneously acted by the same pressure from passage holes 37-40 to stepped pressure receiving surfaces 28c-31c. Consequently, first to fourth lock pins 28-31 can be moved out from lock holes 24-27 at the same timing.

That is, first and second branch passages 41 and 42 have the same sectional area of the passage. Moreover, first to fourth passage holes 37-41 have the same sectional area of the passage. Accordingly, the same hydraulic pressure is simultaneously acted to lock pins 28-31. Consequently, lock pins 28-31 can be simultaneously moved out from the corresponding first to fourth lock holes 24-27. Therefore, the movement of the lock pin in the rearward direction is not delayed, so that the lock pin is not abutted on the hole edge of the lock hole. Accordingly, it is possible to perform the desired valve timing control. Moreover, it is possible to improve the response of the valve timing control.

Moreover, rotor 15 of vane rotor 9 is provided with first to fourth lock pins 28-31 through pin holes 32a-32d. Accordingly, it is possible to sufficiently decrease the circumferential thicknesses of vanes 16a-16d. With this, it is possible to sufficiently increase the relative rotational angle of vane rotor 9 with respect to housing 7.

Moreover, in this embodiment, when the engine is automatically stopped by the idling stop and so on, vane rotor 9 is locked at the rotational position on the most retard angle side by lock mechanism 4, by the mechanical manner, not by the hydraulic pressure. Accordingly, new hydraulic pressure source does not need to be provided. Consequently, it is possible to simplify the apparatus, and to decrease the cost.

Furthermore, when vane rotor 9 is rotated to the first intermediate rotational phase position by lock mechanism 4 in a case where the engine is manually stopped, first lock pin 28 and second lock pin 29 are necessarily guided by the ratchet manner by stepped hole portions 24a and 25a of first lock hole 24 and second lock hole 25, only in directions toward holes 24b and 25b on the advance angle side. Accordingly, it is possible to ensure the sureness and the stability of this guide operation.

Moreover, when vane rotor 9 is rotated on the most retard angle side, fourth lock pin 31 is guided by stepped hole portions 27a and 27b of fourth lock hole 27 in the ratchet manner. Accordingly, it is possible to ensure the sureness and the stability of the guiding operation.

The hydraulic pressures of retard angle hydraulic chambers 11 and advance angle hydraulic chambers 12 are not used as the hydraulic pressure supplied to passage holes 37-41. Accordingly, it is possible to improve the response of the supply of the hydraulic pressure to passage holes 37-41, relative to a case in which the hydraulic pressures of retard angle hydraulic chambers 11 and advance angle hydraulic chambers 12 are used. Therefore, it is possible to improve the response of the movement of lock pins 28-31 from the lock holes 24-27 in the rearward direction.

Moreover, in this embodiment, lock mechanism 4 employs the ratchet manner of the stepped shapes of first, second, and fourth lock holes 24, 25, and 27. With this, it is possible to decrease the thickness of sprocket 1 in which lock holes 24, 25, and 27 are formed. That is, for example, when the lock pin is one and the stepped hole portions of the lock holes are formed into the continuous shape, it is necessary to increase the thickness of sprocket 1 for ensuring the height of the stepped shape. However, as described above, the lock holes are divided into three portions. With this, it is possible to decrease the thickness of sprocket 1. Accordingly, it is possible to decrease the axial length of the valve timing control apparatus. Therefore, it is possible to improve the freedom of the layout.

Second Embodiment

Figure 11:
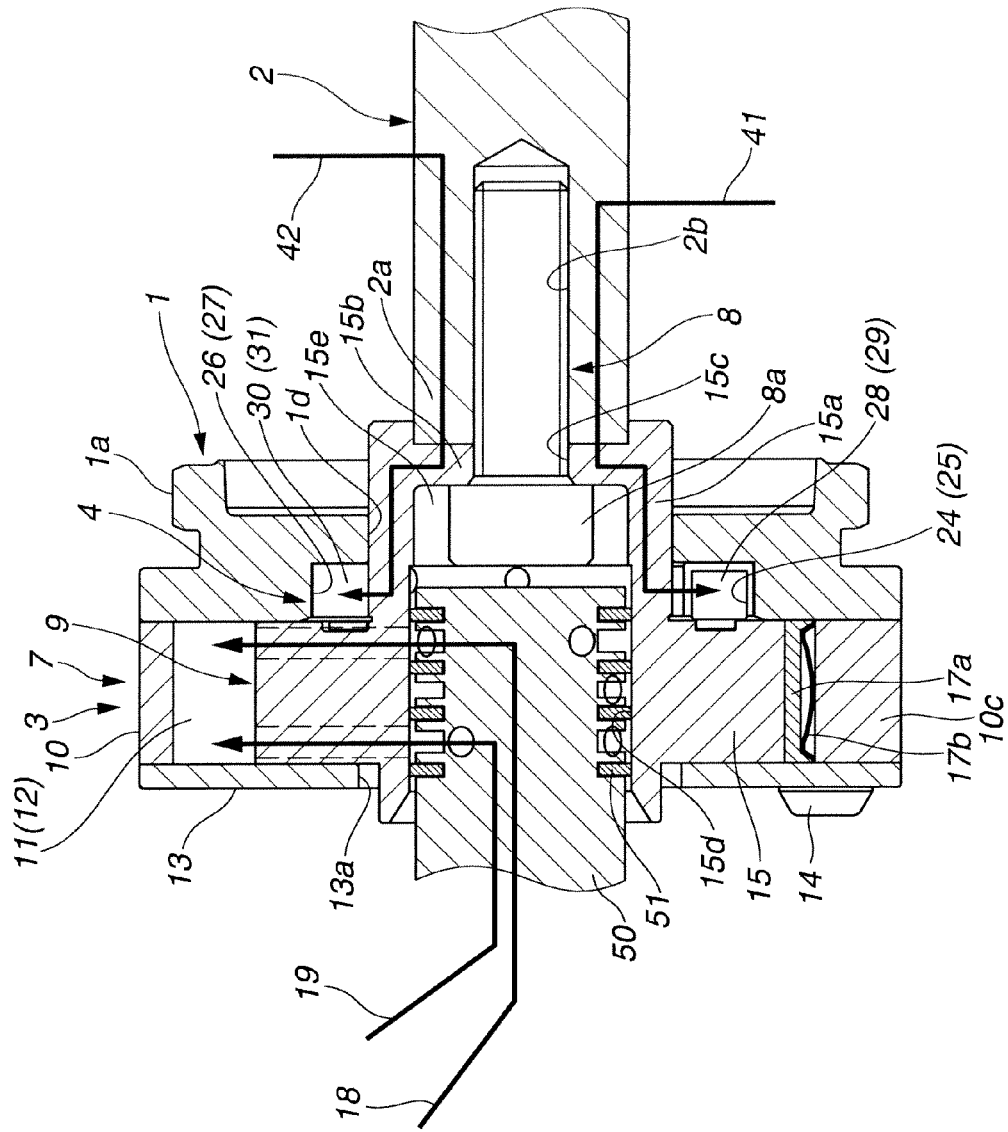
FIG. 11 is a schematic sectional view showing a valve timing control system according to a second embodiment of the present invention.

FIG. 11 shows a second embodiment of the present invention. The circuit structure of hydraulic pressure circuit 5 is partially varied. A part of retard angle passage 18 and a part of advance angle passage 19 are formed in passage constituting portion 50, similarly to the first embodiment. However, first lock release passage 41 and second lock release passage 42 are continuously formed in the inside of cam shaft 2 and fixing portion 15a of rotor 15.

In this way, first and second lock release passages 41 and 42 are formed in cam shaft 2 and the inside of rotor 15. With this, the seal in the passage, that is, the seal member 51 provided in passage constituting section 50 is not needed. Accordingly, it is possible to ease the manufacturing operation and the assembly operation, and to decrease the cost.

Third Embodiment

Figure 12:
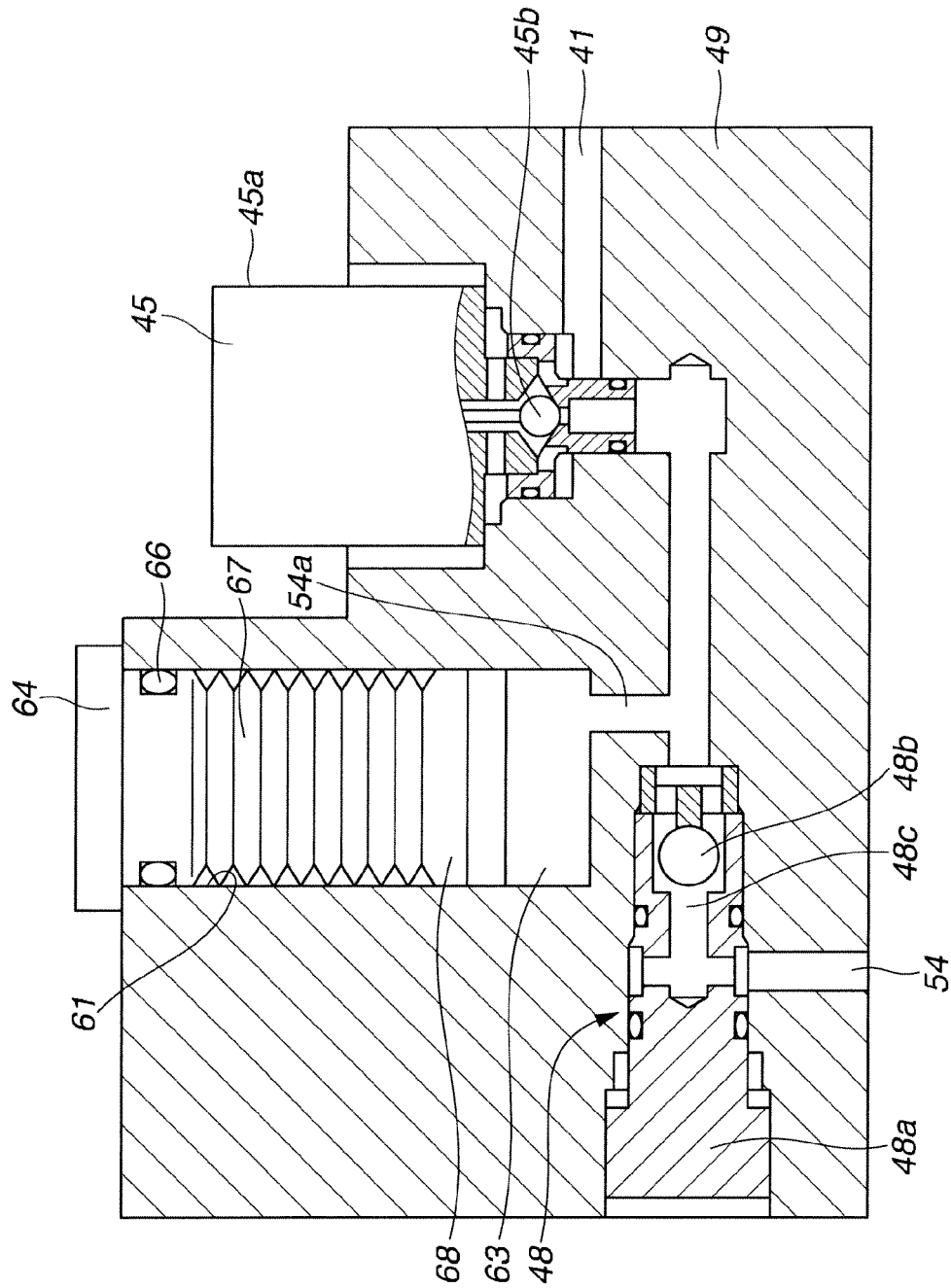
FIG. 12 is a partially sectional view showing an accumulator in a valve timing control system according to a third embodiment of the present invention.

FIG. 12 shows a third embodiment of the present invention. In this third embodiment, the structure of accumulator 47 is varied. An extendable bellows 67 made from a synthetic resin is disposed in cylinder 61. A piston 68 is integrally formed with a tip end portion of bellows 67.

Bellows 67 has the spring force in the extendable direction. Bellows 67 urges piston 68 in a direction in which the hydraulic pressure within pressure storage chamber 63 is compressed.

Accordingly, when the discharge hydraulic pressure is supplied through check valve 48 to pressure storage chamber 63 during the operation of oil pump 43, piston 68 is moved in the rearward direction against the spring force of bellows 68, so that the high hydraulic pressure is stored in pressure storage chamber 63.

The other structures of the third embodiment are identical to the structures of the first embodiment. Accordingly, it is possible to obtain the above-described same functions and effects. Moreover, it is possible to simplify the structure and to improve the assembly operation, by using bellows 67 integral with piston 68.

Fourth Embodiment

Figure 13:
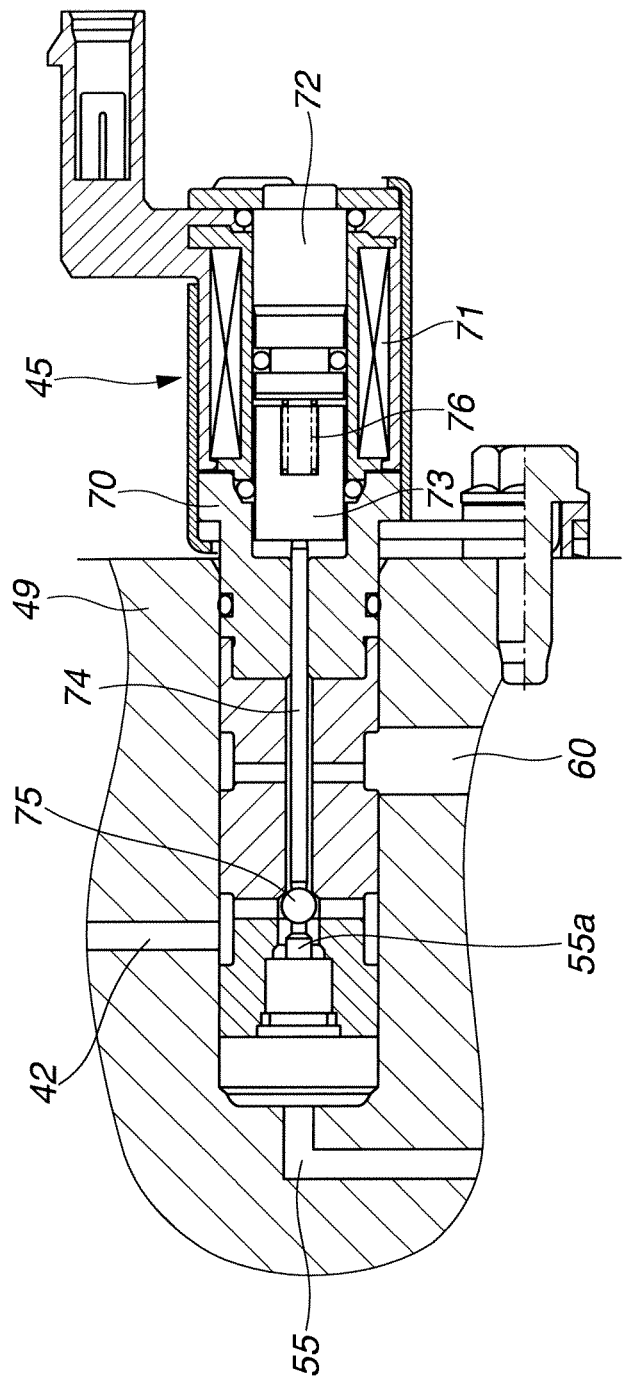
FIG. 13 is a longitudinal sectional view showing a third electromagnetic switching valve in a valve timing control system according to a fourth embodiment of the present invention.

FIG. 13 shows a fourth embodiment. The structure of third electromagnetic switching valve 46 is varied. Third electromagnetic switching valve 46 includes a valve body 70, an electromagnetic coil 71, a fixed iron core 72, and a movable plunger 73 which are received within valve body 70. This movable plunger 73 includes a push rod 74 which is provided at a tip end portion of movable plunger 73, and which is arranged to push a ball valve element 75, and a valve spring 76 which is elastically provided at a rear end portion of movable plunger 73, and arranged to urge push rod 74 through movable plunger 73 in the forward direction.

Ball valve element 75 is provided in the middle of third branch passage 55. Ball valve element 75 is arranged to close passage opening end 55a of third branch passage 55, and to connect second lock release passage 42 and drain passage 60.

That is, in the deenergization state (the OFF state) of electromagnetic coil 71, movable plunger 73 is moved in a forward direction (in a leftward direction in FIG. 13) by the spring force of valve spring 76, so as to push ball valve element 75 through push rod 74. With this, ball valve element 75 closes passage opening end 55a, so as to close the connection between third branch passage 55 and lock release passage 42, and so as to connect lock release passage 42 and drain passage 60. With this, third and fourth lock pins 30 and 31 are engaged with lock holes 26 and 27 by the spring forces of spring members 35 and 36.

On the other hand, when the electronic controller energizes electromagnetic coil 71 (the ON state), movable plunger 73 is moved in a rearward direction (in a rightward direction in FIG. 13) against the spring force of valve spring 76. Accordingly, push rod 74 and ball valve element 75 are moved in the rearward direction so as to connect passage opening end 55a and branch passage 54a, and to disconnect branch passage 54a and drain passage 60. With this, the lock of third and fourth lock pins 30 and 31 are released.

Moreover, in these embodiments, even in the any temperature circumstances of the engine, the locks of lock pins 28 and 29 from lock holes 24 and 25 are rapidly released by the pressure storage of accumulator 47. In addition to this method, it is possible to driven oil pump 80 by an electric motor 81 by omitting accumulator 47 and oil pump 43, as shown by an imaginary line of FIG. 4.

In this embodiment, oil pump 80 is forcibly actuated by using electric motor 81, so that the hydraulic pressure can be supplied to branch passages 53-54. In particular, it is possible to forcibly supply the hydraulic pressure to first lock release passage 41. Accordingly, it is possible to rapidly release the locks of the lock pins 28 and 29 even in the any temperature circumstances of the engine.

The present invention is not limited only to the embodiments. For example, in addition of the vehicle having the idling stop operation, the present invention is applicable to a hybrid vehicle in which the internal combustion engine and the driving motor are used as the driving source.

Moreover, the present invention is applicable to an internal combustion engine having a normal compression ratio, in addition to the internal combustion engine of the high compression ratio.

[a] In the valve timing control system of the internal combustion engine according to the embodiments of the present invention, the valve element of the electromagnetic valve is a ball.

[b] In the valve timing control system of the internal combustion engine according to the embodiments of the present invention, the pressure stored in the accumulator is acted in a direction in which the valve element of the check valve is closed.

[c] In the valve timing control system of the internal combustion engine according to the embodiments of the present invention, the accumulator includes a piston urged by a spring; the accumulator stores the pressure by moving the piston within a cylinder against the urging force of the spring.

[d] In the valve timing control system of the internal combustion engine according to the embodiments of the present invention, the accumulator includes an extendable bellows, and a piston integrally provided with a tip end portion of the bellows; and the accumulator stores the pressure by moving the piston within a cylinder against an urging force of the bellows in an extendable direction of the bellows.

[e] In the valve timing control system of the internal combustion engine according to the embodiments of the present invention, the accumulator includes a seal ring provided on an outer circumference of the piston, and arranged to seal a portion between the piston and the cylinder.

[f] In the valve timing control system of the internal combustion engine according to the embodiments of the present invention, the seal ring is provided at an axial position near the spring.

In the present invention, the seal ring is not provided at the tip end portion of the piston to which the hydraulic pressure is directly acted. The seal ring is provided at the rear end portion of the piston. Accordingly, the hydraulic pressure load is not acted to the seal ring. It is possible to improve the durability.

[g] In the valve timing control system of the internal combustion engine according to the embodiments of the present invention, the valve element of the check valve is a ball.

Accordingly, it is possible to liquid-tightly seat on the valve seat by the ball valve element, and thereby to improve the sealing characteristics.

[h] In the valve timing control system of the internal combustion engine according to the embodiments of the present invention, the lock mechanism includes a lock member which is provided to one of the driving rotational member and the driven rotational member to be moved in a forward direction and in a rearward direction, and a lock recessed portion which is provided to the other of the driving rotational member and the driven rotational member, and in which the lock member is engageably inserted to restrict the relative rotation between the driving rotational member and the driven rotational member; and the lock member is moved out from the lock recessed portion by the supply of the hydraulic pressure so as to release the lock.

[i] In the valve timing control system of the internal combustion engine according to the embodiments of the present invention, the lock member includes a first lock pin and a second lock pin; the lock recessed portion includes a first lock hole and a second lock hole; when the first lock pin is engageably inserted in the first lock hole and the second lock pin is engageably inserted in the second lock hole, the driven rotational member is locked at a predetermined position between a most retard angle position and a most advance angle position, with respect to the driving rotational member.

[j] In the valve timing control system of the internal combustion engine according to the embodiments of the present invention, one of the first lock hole and the second lock hole has a stepped surface whose a depth is increased toward the lock position.

[k] In the valve timing control system of the internal combustion engine according to the embodiments of the present invention, in addition to the lock mechanism, the valve timing control system further includes a second lock mechanism arranged to allow the relative rotation between the driving rotational member and the driven rotational member when the hydraulic pressure supplied to a second lock release passage is equal to or greater than a predetermined pressure, and to lock the relative rotation between the driving rotational member and the driven rotational member to a position nearer to the most retard angle position than the lock position of the lock mechanism, and a third electromagnetic valve arranged to release the lock of the second lock mechanism.

[l] In the valve timing control system of the internal combustion engine according to the embodiments of the present invention, the third electromagnetic valve is disposed between the check valve and the second lock release passage.

[m] In the valve timing control system of the internal combustion engine according to the embodiments of the present invention, the third electromagnetic valve is provided between the second lock release passage and a passage bifurcated from a portion on an upstream side of the check valve.

[n] In the valve timing control system of the internal combustion engine according to the embodiments of the present invention, the check valve, the accumulator, and the electromagnetic valve are provided to a cover mounted to an engine block.

[o] In the valve timing control system of the internal combustion engine according to the embodiments of the present invention, the driven rotational member is rotated in the advance angle direction and in the retard angle direction with respect to the driving rotational member by the supply and the discharge of the hydraulic pressure; and the hydraulic pressure is supplied from the cover.

[p] In the valve timing control system of the internal combustion engine according to the embodiments of the present invention, the first electromagnetic valve is arranged to supply and discharge the hydraulic pressure; and the first electromagnetic valve is mounted to the cover.

[q] In the valve timing control system of the internal combustion engine according to the embodiments of the present invention, the check valve, all of the accumulator, and the second and third electromagnetic valves are mounted to a cover block mounted to the cover.

[r] In the valve timing control system of the internal combustion engine according to the embodiments of the present invention, the driven rotational member includes an opening hole which has a bottom, which is located at a center of the rotation, and which is opened on a tip end side; a passage constituting section constituting a part of a supply and discharge passage provided in the cover is inserted inside the opening hole of the driven rotational member; a volume of a gap between an inner circumference surface of the opening hole of the driven rotational member and an outer circumference surface of the passage constituting section is smaller than a volume of a gap between a tip end of the passage constituting section and a bottom portion of the opening hole of the driven rotational member; and the lock release passage is connected to an inside of the driven rotational member through an outer circumference surface of the passage constituting section.

[s] In the valve timing control system of the internal combustion engine according to the embodiments of the present invention, the lock mechanism locks the driven rotational member when the engine is stopped by an OFF operation of an ignition switch; the engine is started at a position at which the lock mechanism is locked when an engine temperature at a start of the engine is equal to or smaller than a predetermined temperature; and when the engine temperature at the start of the engine is equal to or greater than the predetermined temperature, the lock of the lock mechanism is released, the second lock mechanism locks the driven rotational member, and the engine is started.

[t] In the valve timing control system of the internal combustion engine according to the embodiments of the present invention, in addition to the lock mechanism and the second lock mechanism, the valve timing control system further includes a third lock mechanism arranged to allow the relative rotation between the driving rotational member and the driven rotational member when the hydraulic pressure supplied to the second lock release passage is equal to or greater than a predetermined pressure, and to lock the relative rotation between the driving rotational member and the driven rotational member at the most retard angle position when the hydraulic pressure supplied to the second lock release passage is smaller than the predetermined pressure.

[u] In the valve timing control system of the internal combustion engine according to the embodiments of the present invention, the valve timing control system is employed by a vehicle in which the engine is automatically stopped irrespective of the operation of a driver, and in which the engine is automatically started irrespective of the operation of the driver; when the engine is automatically stopped, the lock by the lock mechanism and the second lock mechanism is released, and the third lock mechanism locks the driven rotational member, and the engine is started.

Because of the engine stop in the high engine temperature state like the idling stop, it is possible to suppress the generation of the knocking such as the pre ignition at the restart of the engine by the lock on the most retard angle side.

[v] In the valve timing control system of the internal combustion engine according to the embodiments of the present invention, the second lock mechanism includes a third lock pin, a fourth lock pin, a third lock hole, and a fourth lock hole; when the third lock pin is inserted into and engaged with the third lock hole and the fourth lock pin is inserted into and engaged with the fourth lock hole, the driven rotational member is locked at the position on the retard angle side of the lock position of the lock mechanism, with respect to the driving rotational member; and the third lock mechanism is locked at the most retard angle position when at least one of the third lock pin and the fourth lock pin is inserted into and engaged with the fifth lock hole.

[w] In the valve timing control system of the internal combustion engine according to the embodiments of the present invention, the fifth lock hole is formed in the bottom portion of one of the third lock hole and the fourth lock hole.

[x] In the valve timing control system of the internal combustion engine according to the embodiments of the present invention, the lock release passage connected with the accumulator is formed from an inside of the cam shaft within the driven rotational member.

The entire contents of Japanese Patent Application No. 2013-58881 filed Mar. 21, 2013 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A valve timing control system for an internal combustion engine comprising:
   a driving rotational member to which a rotational force is transmitted from a crank shaft;
   a driven rotational member which is fixed to a cam shaft, and which is arranged to be relatively rotated with respect to the driving rotational member in an advance angle direction or in a retard angle direction in accordance with a request;
   a lock arranged to allow relative rotation between the driving rotational member and the driven rotational member when hydraulic pressure supplied to a lock release passage is equal to or greater than a predetermined pressure, and to restrict the relative rotation between the driving rotational member and the driven rotational member when hydraulic pressure supplied to the lock release passage is smaller than the predetermined pressure, wherein the lock includes a lock member which is provided to one of the driving rotational member and the driven rotational member to be moved in a forward direction or in a rearward direction, and a lock recessed portion which is provided to the other of the driving rotational member and the driven rotational member, and in which the lock member is engageably inserted to restrict the relative rotation between the driving rotational member and the driven rotational member, and the lock member is moved out from the lock recessed portion by supply of hydraulic pressure so as to release the lock;
   a check valve which is provided between an oil pump driven by the engine, and the lock release passage, which includes a valve seat, and a valve element arranged to be seated on and unseated from the valve seat, and which is arranged to unseat the valve element from the valve seat when a discharge pressure from the oil pump is greater than the hydraulic pressure of the lock release passage to allow a flow of oil from the oil pump toward the lock release passage, and arranged to seat the valve element on the valve seat when the hydraulic pressure of the lock release passage is greater than the discharge pressure of the oil pump to restrict the flow of oil from the lock release passage to the oil pump;
   an electromagnetic valve which is disposed between the check valve and the lock release passage, which includes a valve seat, a valve element, and a valve element driving solenoid, and which is arranged to seat the valve element on the valve seat in a deenergized state of the valve element driving solenoid to restrict the flow of oil from the lock release passage toward the check valve, and arranged to unseat the valve element from the valve seat in an energized state of the valve driving solenoid so as to allow the flow of oil from the check valve toward the lock release passage;
   an accumulator disposed between the check valve and the electromagnetic valve; and
   a passage which is disposed between the check valve and the electromagnetic valve, which is sealed to store oil in the deenergized state of the valve element driving solenoid, to which a pressure of the accumulator is acted in the deenergized state of the valve element driving solenoid, and which is arranged to release restriction of the lock by the pressure of the accumulator by energizing the valve driving solenoid of the electromagnetic valve.

2. The valve timing control system as claimed in claim 1, wherein the pressure stored in the accumulator is acted in a direction in which the valve element of the check valve is closed.

3. The valve timing control system as claimed in claim 1, wherein the accumulator includes a piston urged by a spring; and the accumulator stores the pressure by moving the piston within a cylinder against an urging force of the spring.

4. The valve timing control system as claimed in claim 3, wherein the accumulator includes a seal ring provided on an outer circumference of the piston, and arranged to seal a portion between the piston and the cylinder.

5. The valve timing control system as claimed in claim 4, wherein the seal ring is provided at an axial position near the spring.

6. The valve timing control system as claimed in claim 1, wherein the accumulator includes an extendable bellows, and a piston integrally provided with a tip end portion of the bellows; and the accumulator stores the pressure by moving the piston within a cylinder against an urging force of the bellows in an extendable direction of the bellows.

7. The valve timing control system as claimed in claim 1, wherein the valve element of the check valve is a ball.

8. The valve timing control system as claimed in claim 1, wherein the lock member includes a first lock pin and a second lock pin; the lock recessed portion includes a first lock hole and a second lock hole; when the first lock pin is engageably inserted in the first lock hole and the second lock pin is engageably inserted in the second lock hole, the driven rotational member is locked at a predetermined position between a most retard angle position and a most advance angle position, with respect to the driving rotational member.

9. The valve timing control system as claimed in claim 8, wherein one of the first lock hole and the second lock hole has a stepped surface whose depth is increased toward the lock position.

10. The valve timing control system as claimed in claim 8, wherein in addition to the lock, the valve timing control system further includes a second lock arranged to allow relative rotation between the driving rotational member and the driven rotational member when hydraulic pressure supplied to a second lock release passage is equal to or greater than a predetermined pressure, and to lock the relative rotation between the driving rotational member and the driven rotational member to a position nearer to the most retard angle position than the lock position of the lock, and a third electromagnetic valve arranged to release locking of the second lock.

11. The valve timing control system as claimed in claim 10, wherein the third electromagnetic valve is disposed between the check valve and the second lock release passage.

12. The valve timing control system as claimed in claim 10, wherein the third electromagnetic valve is provided between the second lock release passage and a passage bifurcated from a portion on an upstream side of the check valve.

13. The valve timing control system as claimed in claim 10, wherein the lock locks the driven rotational member when the engine is stopped by an OFF operation of an ignition switch; the engine is started at a position at which the lock is locked when an engine temperature at a start of the engine is equal to or smaller than a predetermined temperature; and when the engine temperature at the start of the engine is equal to or greater than the predetermined temperature, the lock of the lock is released, the second lock locks the driven rotational member, and the engine is started.

14. The valve timing control system as claimed in claim 1, wherein the check valve, the accumulator, and the electromagnetic valve are provided to a cover mounted to an engine block.

15. The valve timing control system as claimed in claim 14, wherein the driven rotational member is rotated in the advance angle direction and in the retard angle direction with respect to the driving rotational member by supply and discharge of hydraulic pressure; and hydraulic pressure is supplied from the cover.

16. The valve timing control system as claimed in claim 14, wherein the driven rotational member includes an opening hole which has a bottom, which is located at a center of rotation, and which is opened on a tip end side; a passage constituting section constituting a part of a supply and discharge passage provided in the cover is inserted inside the opening hole of the driven rotational member; a volume of a gap between an inner circumference surface of the opening hole of the driven rotational member and an outer circumference surface of the passage constituting section is smaller than a volume of a gap between a tip end of the passage constituting section and a bottom portion of the opening hole of the driven rotational member; and the lock release passage is connected to an inside of the driven rotational member through an outer circumference surface of the passage constituting section.

17. The valve timing control system as claimed in claim 1, wherein the lock release passage connected with the accumulator is formed from an inside of the cam shaft within the driven rotational member.

18. A variable valve timing control apparatus for an internal combustion engine comprising:
a driving rotational member to which a rotational force is transmitted from a crank shaft;
a driven rotational member which is fixed to a cam shaft, and which is arranged to be rotated relative to the driving rotational member in an advanced angle direction or in a retard angle direction in accordance with a request;
a lock arranged to allow relative rotation of the driven rotational member with respect to the driving rotational member when hydraulic pressure supplied to a lock release passage is equal to or greater than a predetermined hydraulic pressure, and to restrict the relative rotation between the driving rotational member and the driven rotational member when hydraulic pressure supplied to the lock release passage is smaller than the predetermined hydraulic pressure, wherein the lock includes a lock member which is provided to one of the driving rotational member and the driven rotational member to be moved in a forward direction or in a rearward direction, and a lock recessed portion which is provided to the other of the driving rotational member and the driven rotational member, and in which the lock member is engageably inserted to restrict the relative rotation between the driving rotational member and the driven rotational member, and the lock member is moved out from the lock recessed portion by supply of hydraulic pressure so as to release the lock;
a check valve which is provided between the lock release passage and an oil pump driven by the internal combustion engine, and which is arranged to allow only a flow of oil from the oil pump toward the lock release passage;
an electromagnetic valve which is provided between the check valve and the lock release passage, which includes a valve seat, a valve element, and a valve element driving solenoid, and which is arranged to switch, by the valve element driving solenoid, a restriction state in which the valve element is seated on the valve seat to restrict a flow of oil from the lock release passage toward the check valve, and a flow state in which the valve element is separated from the valve seat to allow the flow of oil from the check valve toward the lock release passage;
an accumulator provided between the check valve and the electromagnetic valve; and
a space portion which is provided between the check valve and the electromagnetic valve, which leakage of oil between an inner side and an outer side of the space portion is suppressed in and a pressure of the accumulator is acted to, in the deenergized state of the valve element driving solenoid, and which is arranged to release restriction by the lock by energization of the valve driving solenoid of the electromagnetic valve.

* * * * *